(12) United States Patent
Ohashi

(10) Patent No.: US 9,104,010 B2
(45) Date of Patent: Aug. 11, 2015

(54) IMAGING LENS, IMAGING APPARATUS, AND INFORMATION DEVICE

(71) Applicant: Kazuyasu Ohashi, Funabashi (JP)

(72) Inventor: Kazuyasu Ohashi, Funabashi (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/026,304

(22) Filed: Sep. 13, 2013

(65) Prior Publication Data

US 2014/0078605 A1    Mar. 20, 2014

(30) Foreign Application Priority Data

Sep. 18, 2012 (JP) ................. 2012-204700

(51) Int. Cl.
*G02B 13/00* (2006.01)

(52) U.S. Cl.
CPC ........ *G02B 13/0015* (2013.01); *G02B 13/0045* (2013.01)

(58) Field of Classification Search
CPC ............. G02B 13/0015; G02B 13/0045
USPC .............................................. 359/754
See application file for complete search history.

(56) References Cited

U.S. PATENT DOCUMENTS

| | | | | |
|---|---|---|---|---|
| 2,734,423 | A | * | 2/1956 | Bertele ............ 359/754 |
| 3,154,628 | A | * | 10/1964 | Bertele ............ 359/755 |
| 4,812,023 | A | | 3/1989 | Kikuchi |
| 5,153,779 | A | | 10/1992 | Ohashi |
| 5,675,440 | A | | 10/1997 | Kanamori |
| 5,796,530 | A | | 8/1998 | Oshita |
| 5,805,359 | A | | 9/1998 | Yamanashi |
| 5,930,056 | A | | 7/1999 | Ohashi |
| 2002/0101665 | A1 | | 8/2002 | Ohashi et al. |
| 2006/0007561 | A1 | | 1/2006 | Suzuki |
| 2006/0024038 | A1 | | 2/2006 | Kawamura et al. |
| 2010/0027136 | A1 | | 2/2010 | Ohashi et al. |
| 2011/0310496 | A1 | | 12/2011 | Kubota et al. |
| 2011/0317285 | A1 | | 12/2011 | Ohashi et al. |
| 2012/0212838 | A1 | | 8/2012 | Ohashi |

FOREIGN PATENT DOCUMENTS

| | | |
|---|---|---|
| CN | 1864087 A | 11/2006 |
| JP | 62-194213 A | 8/1987 |

(Continued)

OTHER PUBLICATIONS

Partial European Search Report issued Oct. 28, 2013, in European Patent Application No. 13184825.1.

(Continued)

*Primary Examiner* — David N Spector
(74) *Attorney, Agent, or Firm* — Oblon, McClelland, Maier & Neustadt, L.L.P.

(57) ABSTRACT

An imaging lens includes a plurality of lenses, wherein a surface on an image side of a lens on an object side and a surface on the object side of a lens on the image side of two lenses arranged adjacently and separately from each other face each other across an air space, the air space is termed an air lens, a shape of the air lens is defined such that the surface on the image side of the lens on the object side is taken as a surface on the object side of the air lens and the surface on the object side of the lens on the image side is taken as a surface on the image side of the air lens, and an air lens positioned on a most object side and an air lens positioned on a most image side each have a biconvex shape.

20 Claims, 22 Drawing Sheets

(56) References Cited

FOREIGN PATENT DOCUMENTS

| JP | 3-215808 | 9/1991 |
| JP | 7-318798 | 12/1995 |
| JP | 8-313802 | 11/1996 |
| JP | 9-15498 A | 1/1997 |
| JP | 11-326756 | 11/1999 |
| JP | 2005-352060 | 12/2005 |
| JP | 2006-30290 | 2/2006 |
| JP | 2012-8347 | 1/2012 |

OTHER PUBLICATIONS

Extended European Search Report issued Jan. 21, 2014 in Patent Application No. 13184825.1.

Office Action issued Feb. 9, 2015 in European Patent Application No. 13 184 825.1.

Chinese Office Action issued in Application No. 201310642969.4 on May 5, 2015 (w/English Translation).

\* cited by examiner

IMAGING LENS, IMAGING APPARATUS, AND INFORMATION DEVICE

CROSS-REFERENCE TO RELATED APPLICATIONS

The present application is based on and claims priority from Japanese Patent Application Number 2012-204700, filed Sep. 18, 2012, the disclosure of which is hereby incorporated by reference herein in its entirety.

BACKGROUND

The present invention relates to improvement of a single focus imaging lens to form an image of a photographic subject in various cameras including a so-called silver-halide camera, in particular, in a digital camera, a video camera, and the like. In particular, the present invention relates to an imaging lens that is suitable as an imaging optical system in an imaging apparatus using an electronic imaging device as a digital camera or a digital video camera, an imaging apparatus such as a camera, or the like using such an imaging lens, and an information device such as a portable information terminal device, or the like having an imaging function.

The market for so-called digital cameras or the like, which obtain digital image data of a photographic subject using a solid-state image sensor, has grown dramatically, and there have been various requests from users regarding such digital cameras, or the like.

Above all, the category of compact cameras with high picture quality, which include a relatively large image sensor having a diagonal length of approximately 20-45 mm and an imaging lens of a high-performance single focus optical system, has gained a great deal of attention.

As requests from users, in addition to high performance, emphasis has been put on excellent portability, that is, miniaturization.

Here, in terms of high performance, in addition to having resolution corresponding to an image sensor of at least 12-24 mega pixels, less comatic flare, high contrast, and no point image distortion in a peripheral part of an angle of view at an open aperture, less chromatic aberration and no occurrence of unnecessary coloring in a part having a large brightness difference, less distortion, and capability of drawing a straight line as a straight line, and so on are at least needed.

In terms of the large diameter, due to the necessity to make different from a general compact camera with a zoom lens, an F-number of at least approximately F2.8 is needed.

In terms of miniaturization, in a high-resolution compact camera, since a large image sensor is used relative to the size of the camera body, an actual focus length is longer than that of a compact camera having a small image sensor. Therefore, in a case of normalizing the camera by a focal length or a maximum image height, it is necessary to shorten the entire length of the imaging lens in the camera.

Additionally, in terms of an angle of view of a photographing lens, many users have demanded a rather wide angle, and it is preferable that a half angle of view of an imaging lens be equal to or more than 35 degrees. The half angle of view of 35 degrees is equivalent to a focal length of about 31 mm in a 35-mm silver-halide camera using traditional 35-mm silver-halide film (so-called Leica format silver-halide film).

As an imaging lens using this kind of digital camera or the like, many kinds of optical systems have been considered; however, as a construction of a major wide-angle single focus lens, a so-called retrofocus-type optical system in which a lens group having a negative refractive power is arranged on an object side, and a lens group having a positive refractive power is arranged on an image side is included.

The main reason why the retrofocus-type optical system is adopted is that there is a request that a position of an exit pupil be distant from an imaging plane, and peripheral light flux be incident onto an area sensor at an angle of preferably approximately a right angle from a characteristic of the area sensor as an image sensor having a color filter and a microlens per each pixel.

However, in the retrofocus-type optical system, a wide-angle lens is used as an interchangeable lens for a single reflex camera, as is clear from adaption of the retrofocus-type optical system for the purpose of securement of a back focal distance, and therefore, an entire lens length (a distance from a surface on a most object side to an image plane) tends to be longer.

On the other hand, in recent years, in a relatively large image sensor having a diagonal length of 20-45 mm, due to improvement and optimization of an on-chip microlens, development of image processing, and the like, a slightly inclined incident state has been allowable as a state where peripheral light flux is incident onto the area sensor.

In particular, a system capable of sufficiently accepting an angle between a principal ray and an optical axis at a maximum image height of about 35-45 degrees is constructible, and it is possible to choose types of lenses more suitable for miniaturization without restricting a condition of vertical incidence of peripheral light flux.

From the above viewpoint, as types of optical systems more suitable for miniaturization than the retrofocus-type optical system, there are an approximately symmetrical-type, and a telephoto-type in which a lens group having a negative refractive power is arranged on an image side. Conventional examples of imaging lenses of this kind are disclosed in Japanese Patent Application publication Numbers H08-313802, H11-326756, 2005-352060, 2012-008347, and the like.

SUMMARY

However, constructions of optical systems disclosed in Japanese Patent Application publication Numbers H08-313802, H11-326756, 2005-352060, and 2012-008347 are not necessarily sufficient in terms of miniaturization and large diameter.

That is, Japanese Patent Application Publication Number H08-313802 discloses an optical system of an approximately symmetrical-type wide-angle lens having a sufficiently large diameter. However, an entire lens length, or an entire lens thickness, which is the length from a surface on a most object side to a surface on a most image side of a lens system, is large, and therefore, there still is a problem in terms of miniaturization.

Japanese Patent Application Publication Number H11-326756 discloses an optical system having a construction close to an approximately symmetrical-type, and achieves a wide angle that exceeds a half angle of view of 50 degrees; however, the large diameter is not particularly intended, and its smallest F-number is F4-4.5, which is large, and therefore, the construction is insufficient.

Japanese Patent Application Publication Number 2005-352060 discloses an optical system having a small entire lens length and thickness; however, since a back focal distance is short, a diameter of a lens close to an image plane is large, which is not sufficiently miniaturized.

Japanese Patent Application Publication Number 2012-008347 discloses an optical system that improves an angle of view, an F-number, and imaging performance; however, a feature of a retrofocus-type optical system strongly remains, and therefore, a problem in terms of miniaturization remains.

An object of the present invention is to provide an imaging lens that is wide-angle where a half angle of view is approximately 35-43 degrees, and has a large diameter where a smallest F-number is approximately F2.8, but is small in all of an entire length, an entire thickness, a diameter of the lens, sufficiently reduces various aberrations, and has high performance having resolution corresponding to an image sensor of 12-24 mega pixels.

In order to achieve the above object, an embodiment of the present invention provides an imaging lens, comprising: a plurality of lenses, wherein a surface on an image side of a lens on an object side and a surface on the object side of a lens on the image side of two lenses arranged adjacently and separately from each other face each other across an air space, the air space is termed an air lens, a shape of the air lens is defined such that the surface on the image side of the lens on the object side is taken as a surface on the object side of the air lens and the surface on the object side of the lens on the image side is taken as a surface on the image side of the air lens, and an air lens positioned on a most object side and an air lens positioned on a most image side in the imaging lens each have a biconvex shape.

In order to achieve the above object, an embodiment of the present invention provides an imaging lens, comprising: a plurality of lenses, wherein in the imaging lens, a surface on an image side of a lens on an object side and a surface on the object side of a lens on the image side of two lenses arranged adjacently and separately from each other face each other across an air space, an air space positioned on a most object side is taken as a first air space, an air space positioned on a most image side is taken as a second air space, a surface on the image side of a lens on the object side forming the first air space is a concave surface, a surface on the object side of a lens on the image side forming the first image side is a concave surface, a surface on the image side of a lens on the object side forming the second air lens is a concave surface, and a surface on the object side of a lens on the image side forming the second air lens is a concave surface.

BRIEF DESCRIPTION OF THE DRAWINGS

Each of FIGS. 21A and 21B is a perspective diagram as viewed from a front side, that is, from an object (photographic subject) side, schematically illustrating an external construction of a digital camera using an imaging lens according to an embodiment of the present invention as an imaging apparatus of Example 11 according to an embodiment of the present invention.

DETAILED DESCRIPTION OF THE PREFERRED EMBODIMENTS

Figure 1:
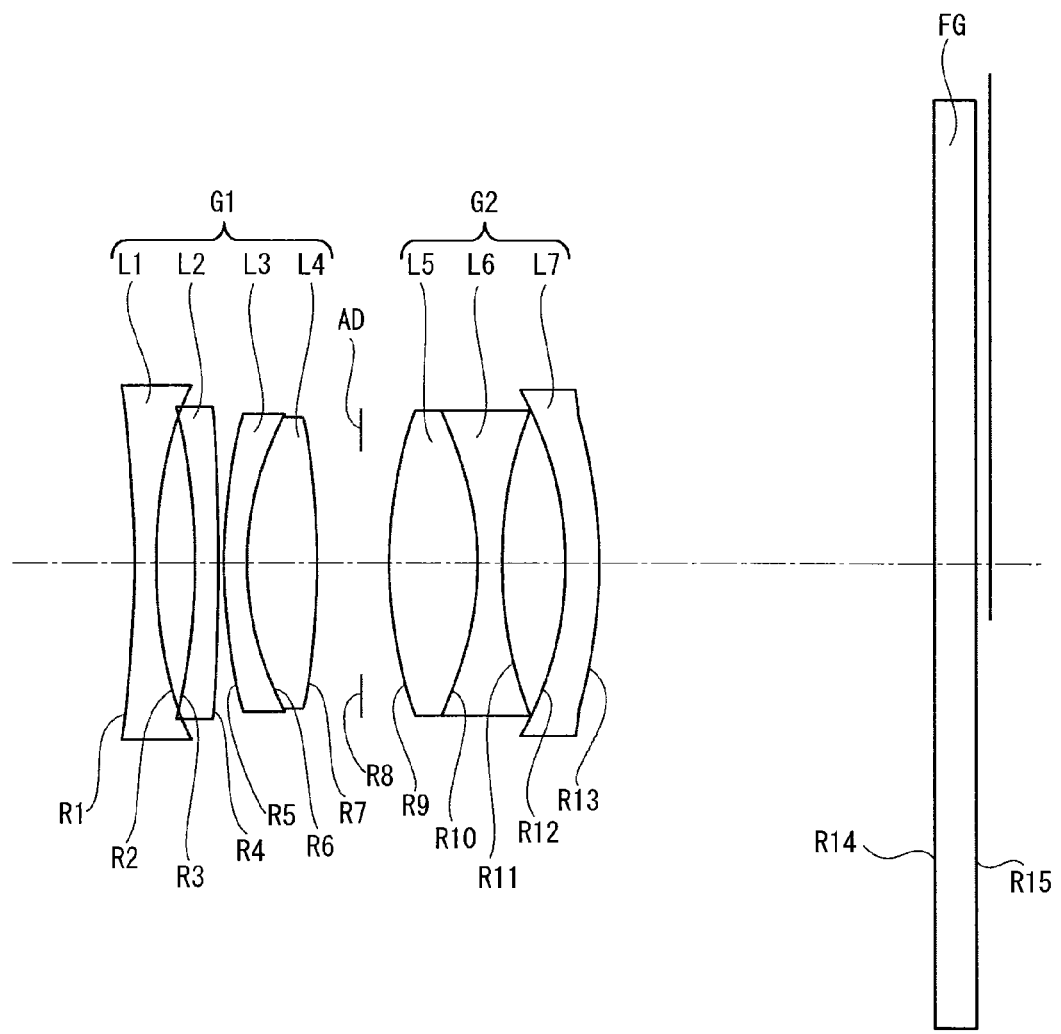
FIG. 1 is a vertical sectional diagram along an optical axis illustrating a construction of an optical system of an imaging lens of Example 1 according to an embodiment of the present invention.

Hereinafter, based on Examples 1 to 10, an imaging lens, an imaging apparatus, and an information device according to embodiments of the present invention will be explained with reference to the drawings. Before explaining Examples by use of specific numerical values, a principled embodiment of the present invention will be explained.

In each of Examples 1 to 10, an imaging lens according to an embodiment of the present invention that constructs an optical system that images an optical image of an object (photographic subject) will be explained.

An imaging lens of Example 1 includes a plurality of lenses, and is a single focus imaging lens to form an image of a photographic subject, which is one with high performance that is wide-angle where a half angle of view is approximately 35-43 degrees, and has a large diameter where a smallest F-number is approximately F2.8, is small in all of an entire length, an entire thickness, a diameter of the lens, sufficiently reduces various aberrations, and has resolution corresponding to an image sensor of 12-24 mega pixels.

That is, an imaging lens of Example 1 is an imaging lens that includes a plurality of lenses. A surface on an image side of a lens on an object side and a surface on the object side of a lens on the image side of two lenses arranged adjacently and separately from each other face each other across an air space, the air space is termed an air lens, and a shape of the air lens is defined such that the surface on the image side of the lens on the object side is taken as a surface on the object side of the air lens, and the surface on the object side of the lens on the image side is taken as a surface on the image side of the air lens. In the imaging lens, an air lens positioned on a most object side and an air lens positioned on a most image side are each formed in a biconvex shape.

Therefore, it is possible to achieve an imaging lens with high performance that is wide-angle, has a large diameter, is small in all of an entire length, an entire thickness, a diameter of the lens, sufficiently reduces various aberrations, and has resolution corresponding to an image sensor having a large number of pixels.

The above imaging lens of Example 1 is an approximately symmetrical-type wide-angle lens having appropriate lens construction and power arrangement that have never existed before, which makes it possible to achieve miniaturization in an entire length, an entire thickness, and a diameter of the lens.

That is, the imaging lens of Example 1 is constructed such that the air lens positioned on the most object side and the air lens positioned on the most image side are each formed in the biconvex shape.

Here, the term the air lens refers to an air space between a surface on the image side of a lens on the object side and a surface on the object side of a lens on the image side of two lenses arranged adjacently that face each other, and a shape of the air lens is defined such that the surface on the image side of the lens on the object side is taken as a surface on the object side of the air lens, and the surface on the object side of the lens on the image side is taken as a surface on the image side of the air lens.

Firstly, the above imaging lens as a whole basically has an approximately symmetrical-type power arrangement in which a negative refractive power on each end of a lens system and a positive refractive power therebetween are arranged, which makes it easy to correct comatic aberration, distortion, and lateral chromatic aberration. Therefore, the air lens positioned on the most object side and the air lens positioned on the most image side are each needed to be constructed to have a negative refractive power.

Additionally, the two air lenses are each formed in the biconvex shape, which makes it possible to correct various aberrations at a high level. In other words, each of a surface on the object side of the air lens positioned on the most object side, a surface on the image side of the air lens positioned on the most object side, a surface on the object side of the air lens positioned on the most image side, and a surface on the image side of the air lens positioned on the most image side is formed to be a convex surface having a negative refractive power.

Forming the surface on the object side of the air lens positioned on the most object side to be the convex surface having a negative refractive power allows for appropriate control of spherical aberration, and mainly simple correction of astigmatism. Forming the surface on the image side of the air lens positioned on the most image side to be the convex surface having a negative refractive power makes it possible to control a distance of an exit pupil, and set an incident angle of a principal ray onto the image plane in a peripheral image height in an appropriate state, and allows for mainly simple correction of comatic aberration and distortion.

Additionally, forming the surface on the image side of the air lens positioned on the most object side to be the convex surface having a negative refractive power makes it possible to achieve a small diameter of a lens on the most object side of the lens system, and allows for simple correction of comatic aberration of a lower light beam. Forming the surface on the object side of the air lens positioned on the most image side to be the convex surface having a negative refractive power makes it possible to achieve a small diameter of a lens on the most image side, and allows for simple correction of comatic aberration of an upper light beam. Therefore, it is an advantage for achievement of miniaturization and high performance.

As described above, in such an imaging lens, construction of each part is optimized for a purpose, which allows for an effect that never existed before as a whole, and therefore, it is possible to achieve a miniaturized wide-angle imaging lens having a large diameter and high performance.

Additionally, only each of the air lenses positioned on the most object side and the air lens positioned on the most image side is an air lens having a negative power in the above imaging lens, so that the construction of the optical system can be further optimized to be an imaging lens with higher performance.

The above imaging lens is configured to satisfy the following Conditional Expressions:

$$-0.6 < (r_{1o} + r_{2o})/(r_{1o} - r_{2o}) < 0.3 \quad [1]$$

$$-0.2 < (r_{1i} + r_{2i})/(r_{1i} - r_{2i}) < 0.5 \quad [2]$$

where $r_{1o}$ is a curvature radius of the surface on the object side of the air lens positioned on the most object side, $r_{2o}$ is a curvature radius of the surface on the image side of the air lens positioned on the most object side, $r_{1i}$ is a curvature radius of the surface on the object side of the air lens positioned on the most image side, and $r_{2i}$ is a curvature radius of the surface on the image side of the air lens positioned on the most image side.

The imaging lens can be a miniaturized imaging lens with high performance in which a shape of an air lens is optimized, and spherical aberration, astigmatism, and comatic aberration are more favorably corrected.

That is, regarding a shape of each of the air lenses positioned on the object side and on the image side, it is possible to obtain higher imaging performance by satisfying the above Conditional Expressions [1] and [2].

When a lower limit value of parameters of Conditional Expression [1] is less than or equal to −0.6, a refractive power of the surface on the object side of the air lens positioned on the most object side becomes relatively too strong, and it is unfavorable that spherical aberration tends to occur in an under-corrected direction, and field curvature tends to shift largely to a negative side at an intermediate image height. On the other hand, when an upper limit value of parameters of Conditional Expression [1] is equal to or more than 0.3, a refractive power of the surface on the image side of the air lens positioned on the most object side becomes relatively too strong, and it is unfavorable that spherical aberration tends to occur in an over-corrected direction, field curvature tends to shift to a positive side in a peripheral portion, and comatic aberration tends to remain.

And when a lower limit value of parameters of Conditional Expression [2] is less than or equal to −0.2, a refractive power of the surface on the object side of the air lens positioned on the most image side becomes relatively too strong, and it is unfavorable that spherical aberration tends to occur in an over-corrected direction, and internal comatic aberration tends to remain. On the other hand, an upper limit value of parameters of Conditional Expression [2] is equal to or more than 0.5, a refractive power of the surface on the image side of the air lens positioned on the most image side tends to become relatively too strong, and it is unfavorable that astigmatism tends to occur, and comatic aberration in a pupil peripheral portion tends to be disturbed. By satisfying Conditional Expression [2], the position of the exit pupil is controlled, and the incident angle of the principal ray onto the image plane in the peripheral image height is set in an appropriate state.

The above imaging lens includes a front lens group having a positive refractive power, an aperture, and a rear lens group having a positive refractive power arranged in order from the object side to the image side, and the air lens positioned on the most object side is arranged in the front lens group, and the air lens positioned on the most image side is arranged in the rear lens group, so that refractive powers before and behind the aperture can be positive, and therefore, the imaging lens can be a small imaging lens with high performance in which distortion, comatic aberration, lateral chromatic aberration, and the like are corrected favorably.

That is, the imaging lens is constructed of the front lens group having the positive refractive power, the aperture, and the rear lens group having the positive refractive power arranged in order from the object side to the image side, and the front lens group includes the air lens positioned on the most object side, and the rear lens group includes the air lens positioned on the most image side.

By balancing a negative refractive power by the air lens at both ends of the lens system, and setting both refractive powers before and behind the aperture to be positive, so that an approximately symmetrical-type power arrangement is further ensured, it is possible to correct comatic aberration, distortion, lateral chromatic aberration more favorably.

Moreover, each of the front lens group and the rear lens group in the above imaging lens includes more than or equal to three lenses and less than or equal to four lenses.

It is preferable that the above imaging lens be a miniaturized imaging lens with high performance in which each lens group includes a sufficient number of lenses, and various aberrations are corrected more favorably.

The air lens positioned on the most object side and the air lens positioned on the most image side have relatively strong negative refractive powers, since they are both formed in the biconvex shape. Therefore, in order that the overall lens system can have a positive focal length as an imaging lens, it is necessary to arrange strong positive refractive powers before and behind the aperture. In order to establish such a power arrangement reasonably, and achieve favorable aberration correction, in addition to a lens constructing the air lens, it is preferable that a positive lens be provided each before and behind the aperture. In order to construct an air lens, two lenses are needed, and therefore, each of the front lens group and the rear lens group is constructed of equal to or more than three lenses and less than or equal to four lenses.

Furthermore, in the imaging lens, a surface on the most image side of the front lens group and a surface on the most object side of the rear lens group each have a convex surface. It is preferable that the above imaging lens be a miniaturized imaging lens with high performance in which symmetry of surfaces facing each other across the aperture is considered, and comatic aberration is corrected more favorably.

That is, the surface on the most image side of the front lens group and the surface on the most object side of the rear lens group, in other words, surfaces of actual lenses (not air lenses but substantive lenses) facing the aperture therebetween are each formed as a convex surface (formed in a convex shape on an aperture side). As described above, the above imaging lens basically has an approximately symmetrical-type power arrangement, and also in the two surfaces facing each other across the aperture, the approximately symmetrical-type power arrangement is adopted, and therefore, it is possible to correct comatic aberration at an extremely high level.

More specifically, the above imaging lens is configured to satisfy the following Conditional Expression:

$$-0.2 < (r_{1s} + r_{2s})/(r_{1s} - r_{2s}) < 0.7 \qquad [3]$$

where $r_{1s}$ is a curvature radius of the surface on the most image side of the front lens group, and $r_{2s}$ is a curvature radius of the surface on the most object side of the rear lens group.

It is preferable that the above imaging lens be a miniaturized imaging lens with high performance in which symmetry of the surfaces facing each other across the aperture is considered, and comatic aberration is corrected more favorably.

Furthermore, the above imaging lens is configured to satisfy the Conditional Expression:

$$0.3 < f_F/f_R < 2.5 \qquad [4]$$

where $f_F$ is a focal length of the front lens group, and $f_R$ is a focal length of the rear lens group.

It is preferable that the above imaging lens be a miniaturized imaging lens with high performance in which a refractive power ratio between before and behind the aperture is optimized, and distortion, comatic aberration, lateral chromatic aberration, and the like are corrected more favorably.

When a lower limit value of parameters of Conditional Expression [4] is less than or equal to 0.3, a refractive power on the front side before the aperture becomes relatively too strong, and it is unfavorable that distortion tends to shift in a positive direction in the peripheral portion, internal comatic aberration tends to occur, and lateral chromatic aberration of a short wavelength tends to occur toward inside of an image screen. On the other hand, when an upper limit value of parameters of Conditional Expression [4] is equal to or more than 2.5, a refractive power on the rear side behind the aperture becomes relatively too strong, and it is unfavorable that negative distortion tends to occur, external comatic aberration tends to occur, and lateral chromatic aberration of a short wavelength tends to occur toward outside of the image screen.

Additionally, the above imaging lens is configured to satisfy the following Conditional Expressions:

$$0.7 < Y'/f < 0.95 \quad [5]$$

$$0.6 < \tan(\theta P_{max}) < 0.95 \quad [6]$$

where Y' is a maximum image height, f is a focal length of an entire system of the imaging lens in a state of focusing on an object at infinity, and $\theta P_{max}$ is an incident angle of a principal ray onto an image plane that reaches the maximum image height.

The above imaging lens can be an imaging lens with high performance in which both a wide angle and miniaturization are achieved.

The above imaging lens aims for miniaturization and high performance by properly controlling an incident angle of a principal ray onto an image plane that reaches the maximum image height in a wide-angle lens in which a half angle of view is equal to or more than 35 degrees, and it is preferable to satisfy Conditional Expressions [5] and [6].

That is, by Conditional Expression [5], an angle of view of an imaging lens is controlled such that an effect of an embodiment of the present invention is brought about most. By Conditional Expression [6], an incident angle of an off-axis ray onto an image plane of an imaging lens is controlled such that an effect of an embodiment of the present invention is brought about most.

The imaging lens is configured to satisfy the following Conditional Expression:

$$1.4 < L/f < 2.0 \quad [7]$$

where L is a distance from a surface on a most object side of the imaging lens to an image plane in a state of focusing on an object at infinity, and f is a focal length of an entire system of the imaging lens in a state of focusing on an object at infinity.

The above imaging lens can be an imaging lens with high performance in which an entire length and an entire thickness of the lens are optimized so as to be at most effective.

Additionally, the above imaging lens is configured to satisfy the following Conditional Expression:

$$0.7 < D_T/f < 1.2 \quad [8]$$

where Dt is a distance from a surface on a most object side of the imaging lens to a surface on a most image side of the imaging lens, and f is a focal length of an entire system of the imaging lens in a state of focusing on an object at infinity.

The above imaging lens can be an imaging lens with high performance in which an entire length and an entire thickness of the lens are optimized so as to be at most effective.

That is, by Conditional Expression [7], an entire length of the imaging lens (a distance from a surface on a most object side of a lens system to an image plane) is controlled such that an effect of an embodiment of the present invention is brought about most.

Moreover, by Conditional Expression [8], an entire thickness (a distance from a surface on a most object side to a surface on a most image side of a lens system) of the imaging lens is controlled such that an effect of an embodiment of the present invention is brought about most.

Furthermore, it is preferable that in the front lens group, a negative lens having a concave surface on the image side, and a negative lens having a concave surface on the object side be arranged in order from the most object side to the image side, and a biconvex air lens be formed therebetween. And it is preferable that in the rear lens group, a single meniscus lens having a concave surface on the object side, or a cemented meniscus lens having a concave surface on the object side, and a negative lens having a concave surface on the image side be arranged in order from the most image side to the object side, and a biconvex air lens be formed therebetween.

Assuming a case of the above construction, it is preferable that the imaging lens be configured to satisfy the following Conditional Expression:

$$-0.2 < f_{FF}/f_{RR} < 0.5 \quad [9]$$

where $f_{FF}$ is a focal length of a negative lens having a concave surface on an image side that is arranged on a most object side in the front lens group, and $f_{RR}$ is a focal length of a single meniscus lens having a concave surface on an object side, or a cemented meniscus lens having a concave surface on an object side that is arranged on a most image side in the rear lens group.

The imaging lens according to an embodiment of the present invention aims for miniaturization and high performance by making an incident angle of a principal ray onto an image plane that reaches a maximum image height equivalent to a half angle of view (approximately 35 degrees-40 degrees-43 degrees each).

When a lower limit value of parameters of Conditional Expression [9] is less than or equal to −0.2, a retrofocus characteristic becomes strong, a principal point moves to the image side, and it is difficult to shorten an entire lens length. Additionally, an exit pupil moves to the object side, and the rear lens group tends to have a larger diameter.

On the other hand, when an upper limit value of parameters of Conditional Expression [9] is equal to or more than 0.5, a telephoto characteristic becomes strong, a principal point moves to the object side, an entire lens length becomes too short, and it is unfavorable that a degree of freedom of correction of various aberrations is limited, and production error sensitivity increases. Additionally, an exit pupil moves to the image side, and an incident angle of a principal ray onto the image plane in a peripheral image height tends to be large.

In order to correct aberration more favorably, it is more preferable that the imaging lens be configured to satisfy the following Conditional Expression:

$$0.0 < f_{FF}/f_{RR} < 0.4 \quad [9']$$

In order to correct aberration more favorably, it is preferable that each of a lens that is arranged on the most object side and a lens that is arranged on the most image side has an aspheric surface. This makes it possible to achieve a great effect for correction of astigmatism, comatic aberration, and distortion.

It is preferable that the imaging lens according to an embodiment of the present invention be constructed as a single focus lens, and focusing can be performed by moving the whole imaging lens.

Example 11 according to an embodiment of the present invention is an imaging apparatus that is constructed of the above imaging lens of Example 1 (including later described Examples 2 to 10) according to an embodiment of the present invention as an imaging optical system.

That is, an imaging optical system in an imaging apparatus such as a digital camera, or the like is constructed of the above imaging lens, and the imaging apparatus can be a miniaturized imaging apparatus with high picture quality using an imaging lens that is wide-angle where a half angle of view is approximately 35 to 43 degrees, has a large diameter where a smallest F-number is approximately F2.8, is small in all of an entire thickness, and a diameter of the lens, sufficiently reduces various aberrations, and has resolution corresponding to a 12 to 24 mega-pixel image sensor as the imaging optical system.

In addition, an imaging optical system in an information device such as a portable information terminal device, or the like having an imaging function is constructed of the above imaging lens, and likewise, the information device can be a miniaturized information device with high picture quality using a miniaturized imaging lens with high performance as an imaging optical system of an imaging function part.

An imaging lens, including: a plurality of lenses, in which in the imaging lens, a surface on an image side of a lens on an object side and a surface on the object side of a lens on the image side of two lenses arranged adjacently and separately from each other face each other across an air space, an air space positioned on a most object side is taken as a first air space, an air space positioned on a most image side is taken as a second air space, a surface on the image side of a lens on the object side forming the first air space is a concave surface, a surface on the object side of a lens on the image side forming the first image side is a concave surface, a surface on the image side of a lens on the object side forming the second air lens is a concave surface, and a surface on the object side of a lens on the image side forming the second air lens is a concave surface.

The imaging lens is configured to satisfy Conditional Expressions:

$$-0.6 < (r_{1o} + r_{2o})/(r_{1o} - r_{2o}) < 0.3 \quad [1]$$

$$-0.2 < (r_{1i} + r_{2i})/(r_{1i} - r_{2i}) < 0.5 \quad [2]$$

where $r_{1o}$ is a curvature radius of the surface on the image side of the lens on object side forming the first air space, $r_{2o}$ is a curvature radius of the surface on the object side of the lens on the image side forming the first air space, $r_{1i}$ is a curvature radius of the surface on the image side of the lens on the object side forming the second air space, and $r_{2i}$ is a curvature radius of the surface on the object side of the lens on the image side forming the second air space.

The imaging lens including a front lens group having a positive refractive power, an aperture, and a rear lens group having a positive refractive power arranged in order from the object side to the image side, in which the first air space is arranged in the front lens group, and the second air space is arranged in the rear lens group.

The front lens group and the rear lens group each have equal to or more than three lenses and less than or equal to four lenses.

A surface on the most image side of the front lens group and a surface on the most object side of the rear lens group each have a convex surface.

An imaging apparatus including: an imaging optical system constructed of the imaging lens.

An information device having an imaging function, including: an imaging optical system constructed of the imaging lens.

Next, with reference to the drawings, specific examples will be explained below.

Each of the following Examples 1 to 10 illustrates an example of a specific construction of an imaging lens according to an embodiment of the present invention by use of specific numerical value examples. Example 11 illustrates an imaging apparatus or an information device according to an embodiment of the present invention using an imaging lens illustrated in Examples 1 to 10.

Figure 2:
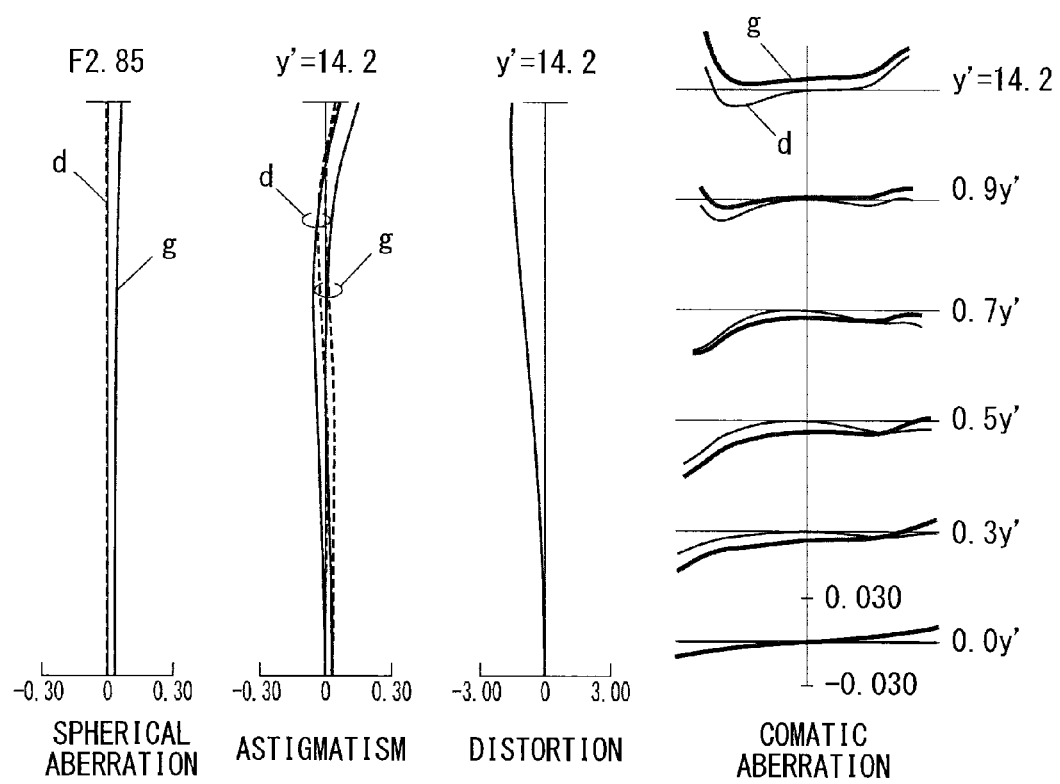
FIG. 2 illustrates aberration curve diagrams of spherical aberration, astigmatism, distortion, and comatic aberration regarding a d line and a g line in the imaging lens of Example 1 illustrated in FIG. 1.
Figure 3:
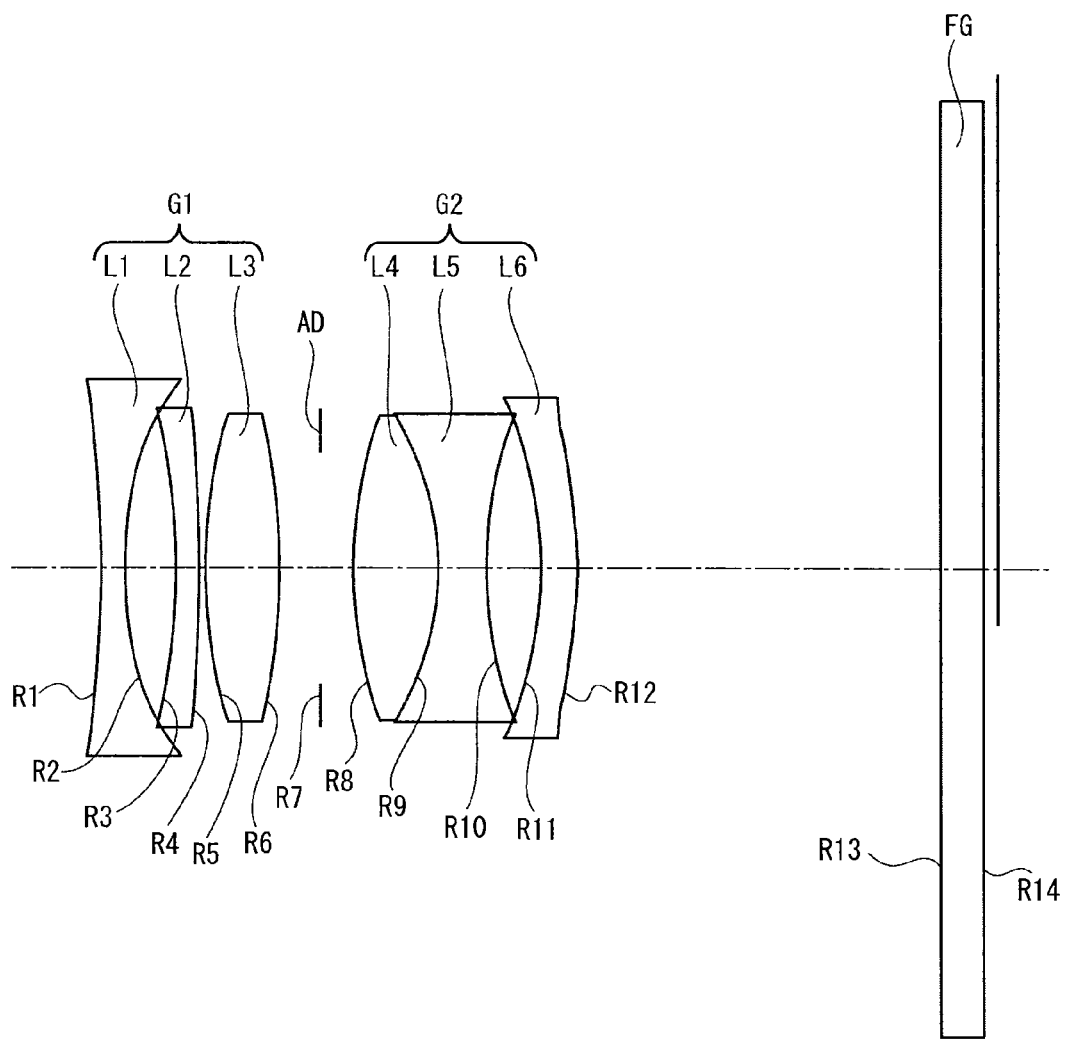
FIG. 3 is a vertical sectional diagram along an optical axis illustrating a construction of an optical system of an imaging lens of Example 2 according to an embodiment of the present invention.
Figure 4:
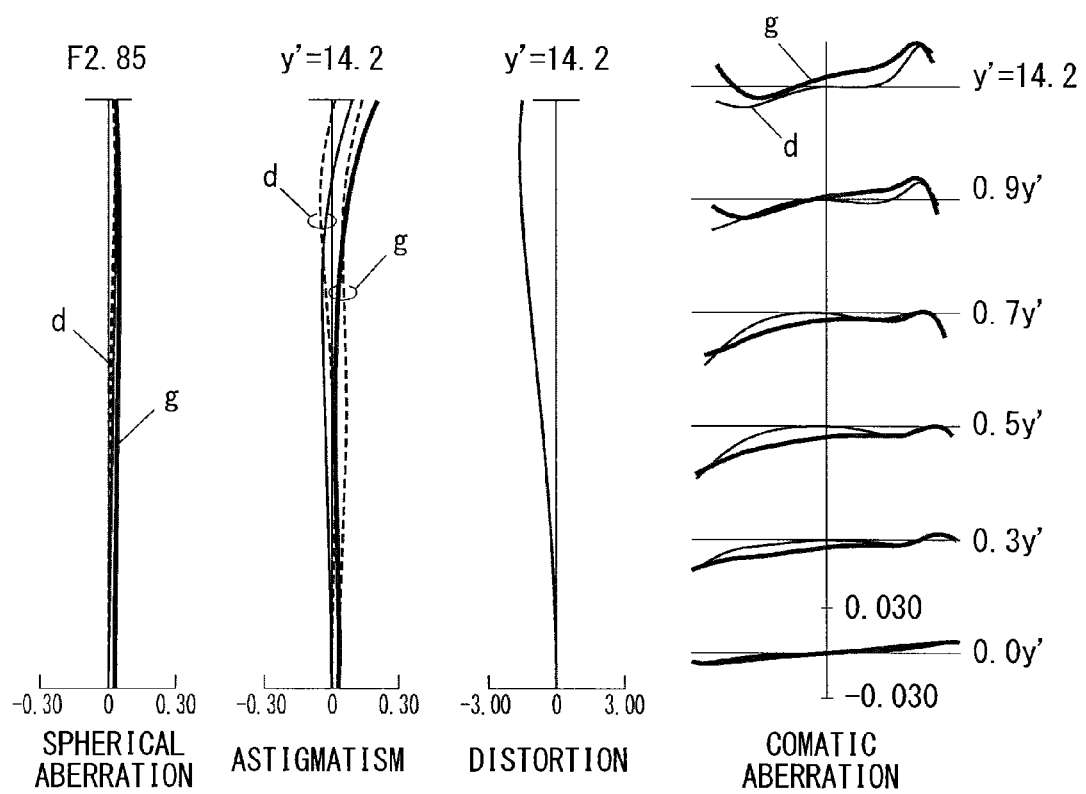
FIG. 4 illustrates aberration curve diagrams of spherical aberration, astigmatism, distortion, and comatic aberration regarding a d line and a g line in the imaging lens of Example 2 illustrated in FIG. 3.
Figure 5:
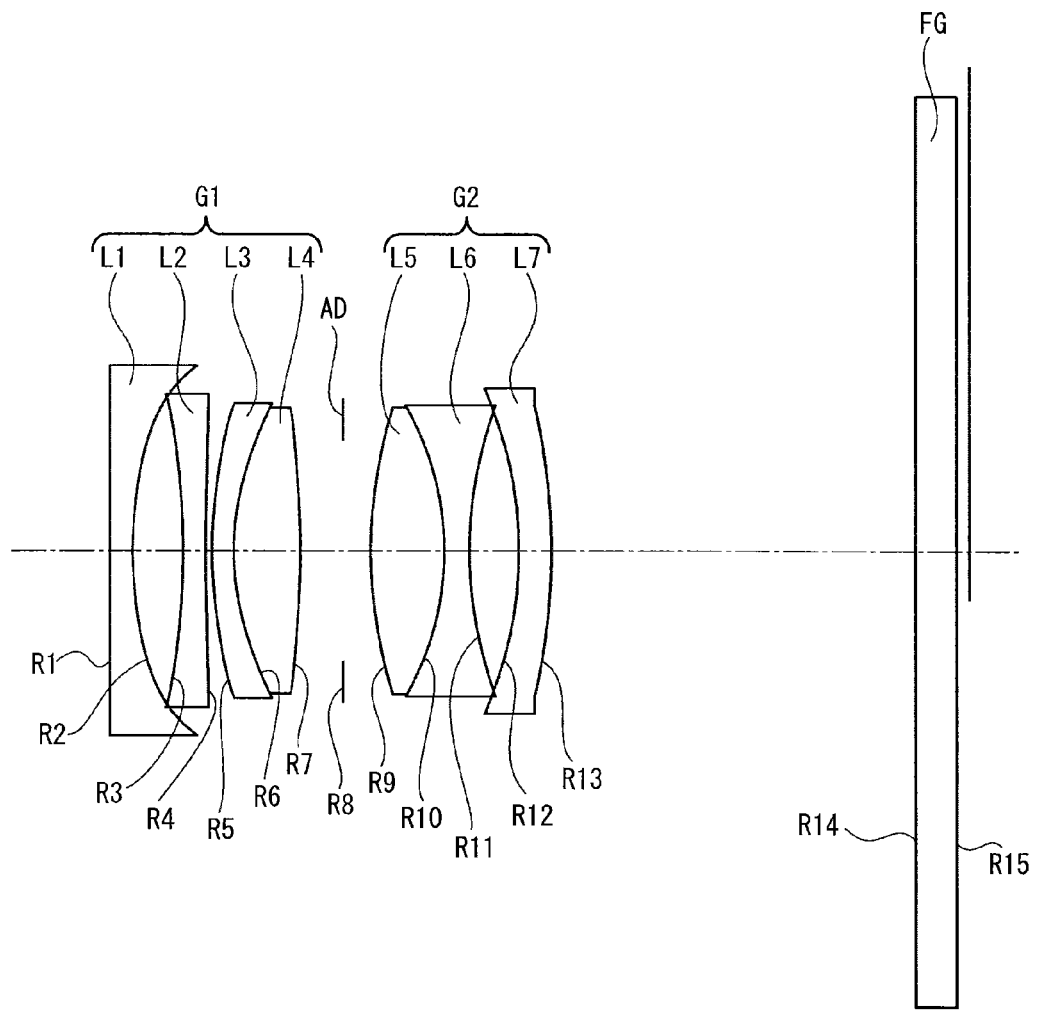
FIG. 5 is a vertical sectional diagram along an optical axis illustrating a construction of an optical system of an imaging lens of Example 3 according to an embodiment of the present invention.
Figure 6:
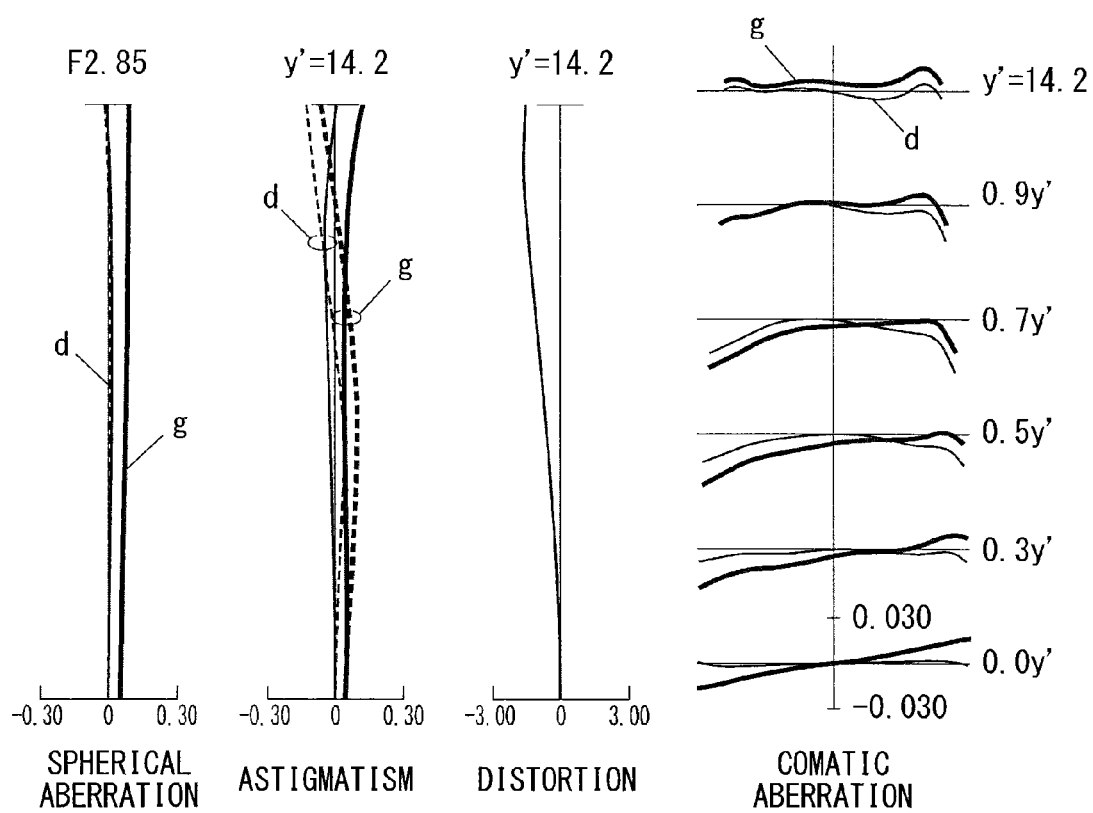
FIG. 6 illustrates aberration curve diagrams of spherical aberration, astigmatism, distortion, and comatic aberration regarding a d line and a g line in the imaging lens of Example 3 illustrated in FIG. 5.
Figure 7:
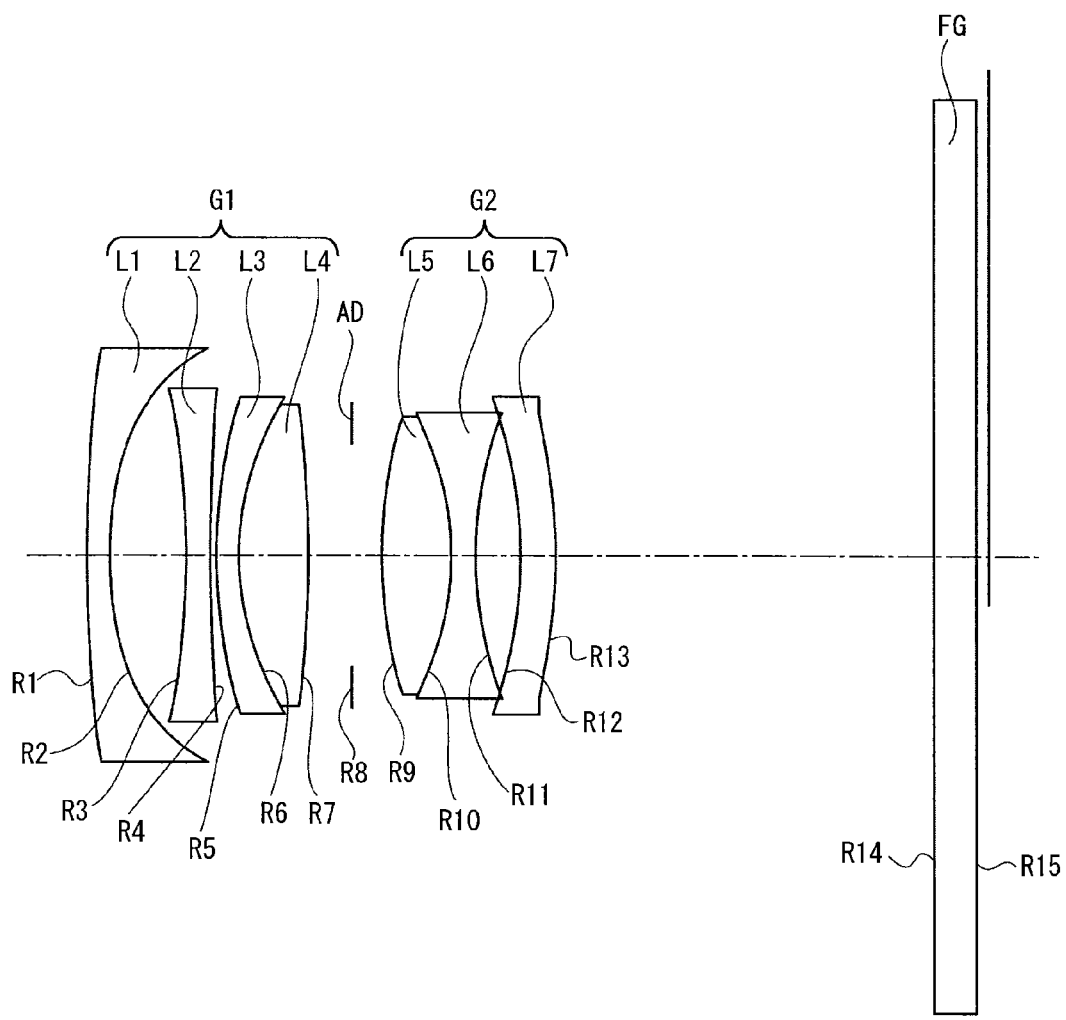
FIG. 7 is a vertical sectional diagram along an optical axis illustrating a construction of an optical system of an imaging lens of Example 4 according to an embodiment of the present invention.
Figure 8:
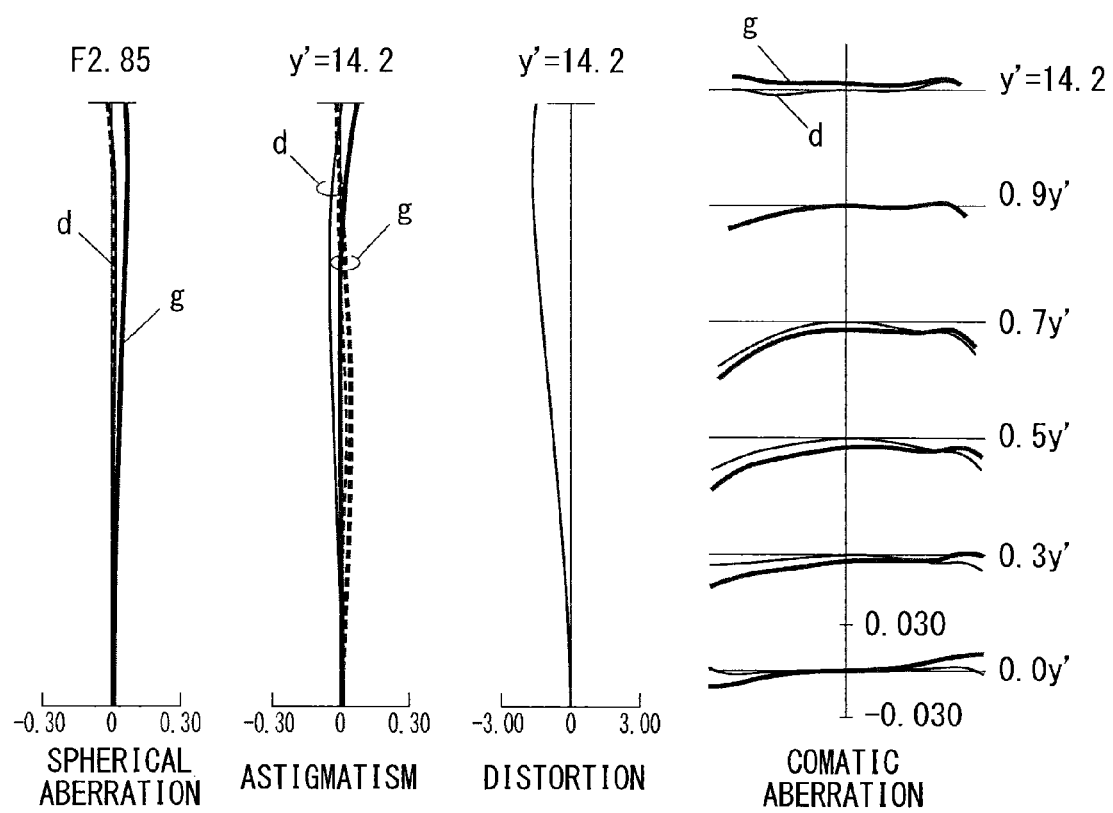
FIG. 8 illustrates aberration curve diagrams of spherical aberration, astigmatism, distortion, and comatic aberration regarding a d line and a g line in the imaging lens of Example 4 illustrated in FIG. 7.
Figure 9:
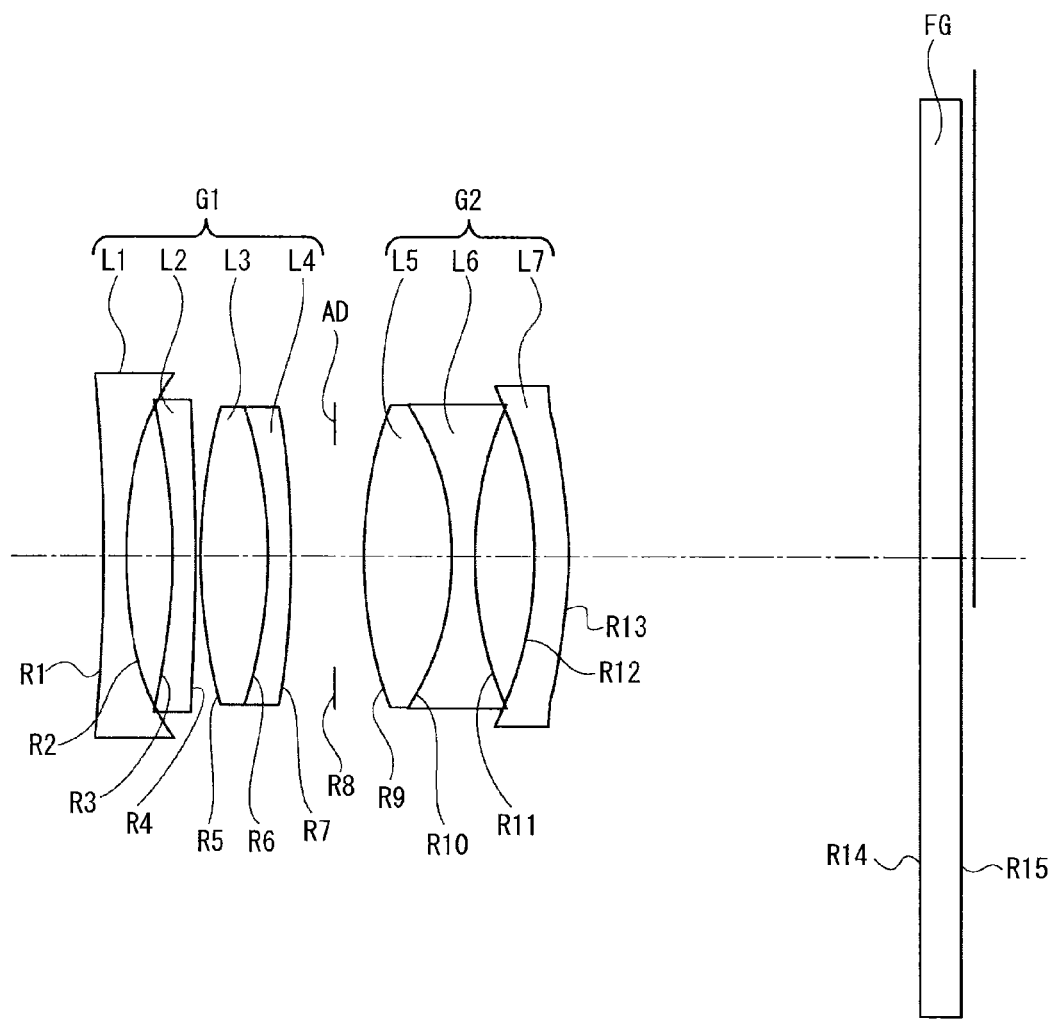
FIG. 9 is a vertical sectional diagram along an optical axis illustrating a construction of an optical system of an imaging lens of Example 5 according to an embodiment of the present invention.
Figure 10:
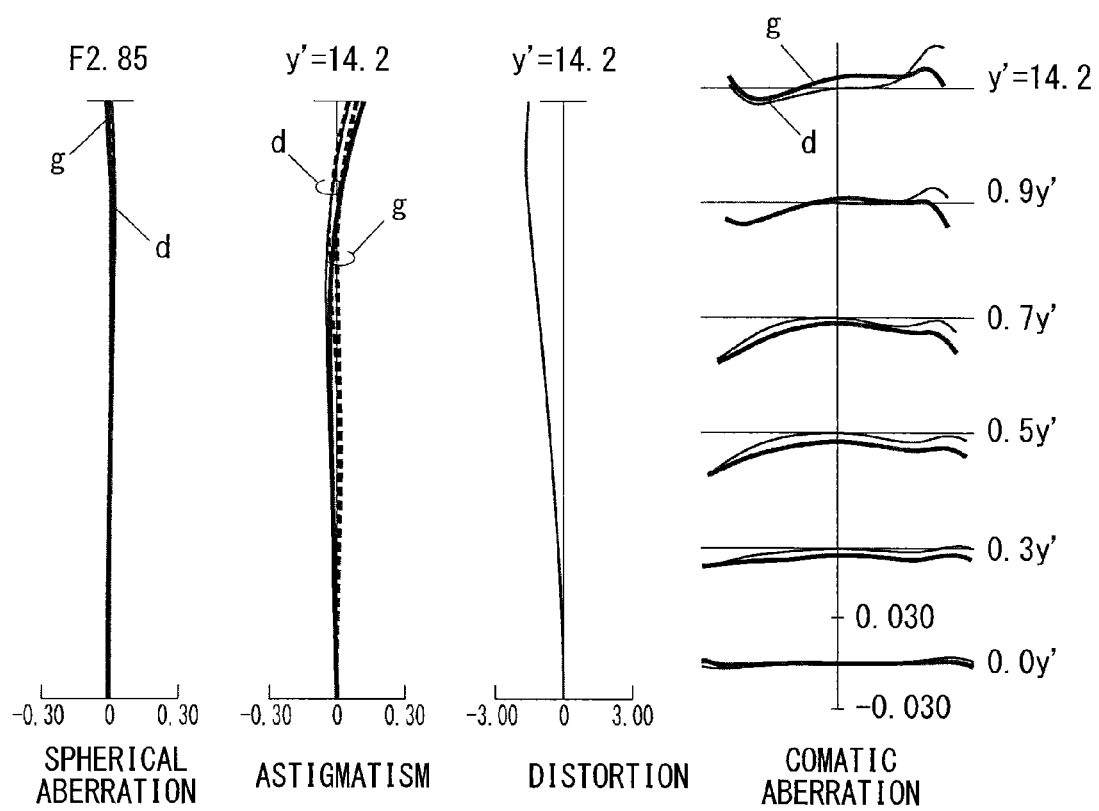
FIG. 10 illustrates aberration curve diagrams of spherical aberration, astigmatism, distortion, and comatic aberration regarding a d line and a g line in the imaging lens of Example 5 illustrated in FIG. 9.
Figure 11:
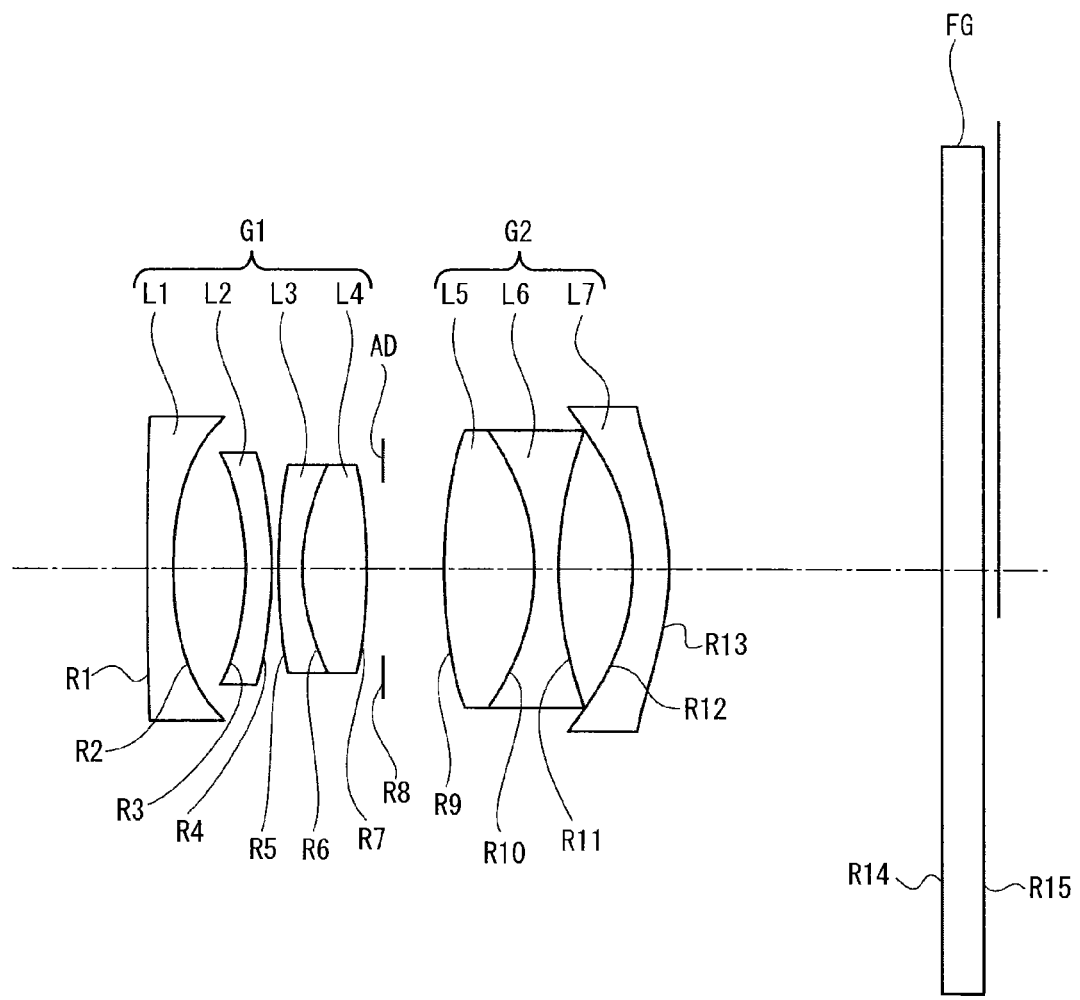
FIG. 11 is a vertical sectional diagram along an optical axis illustrating a construction of an optical system of an imaging lens of Example 6 according to an embodiment of the present invention.
Figure 12:
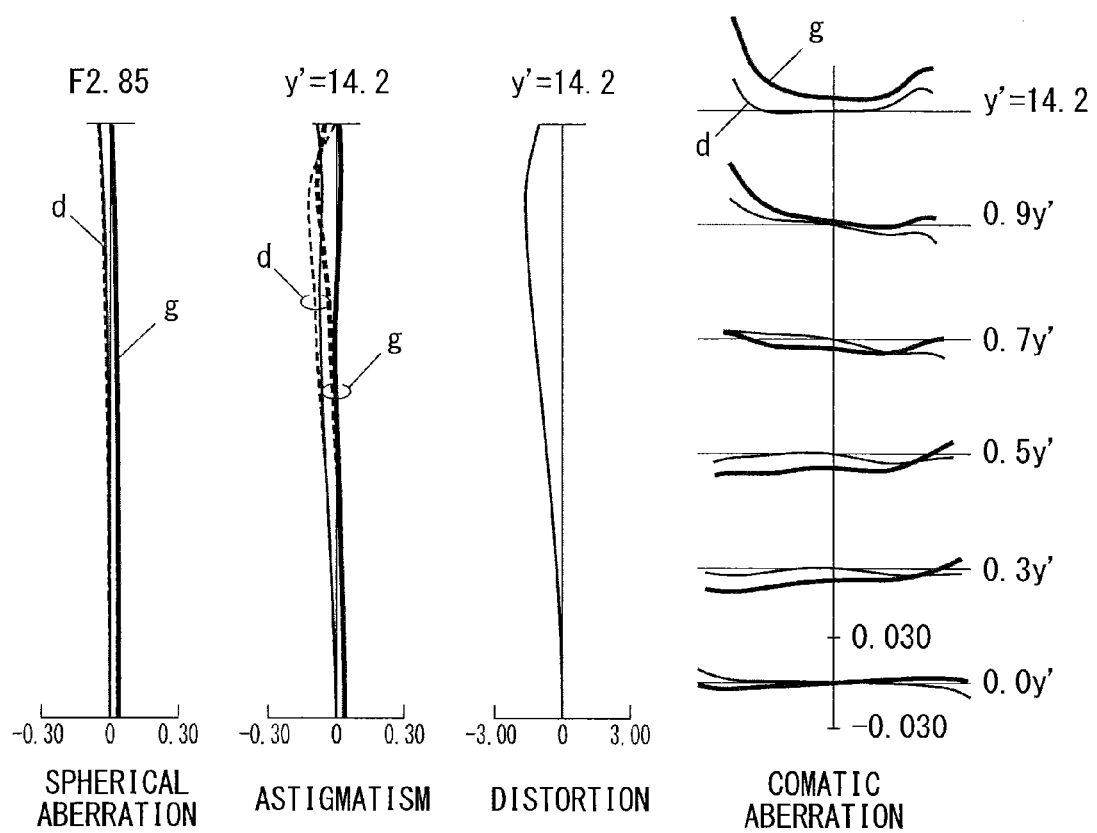
FIG. 12 illustrates aberration curve diagrams of spherical aberration, astigmatism, distortion, and comatic aberration regarding a d line and a g line in the imaging lens of Example 6 illustrated in FIG. 11.
Figure 13:
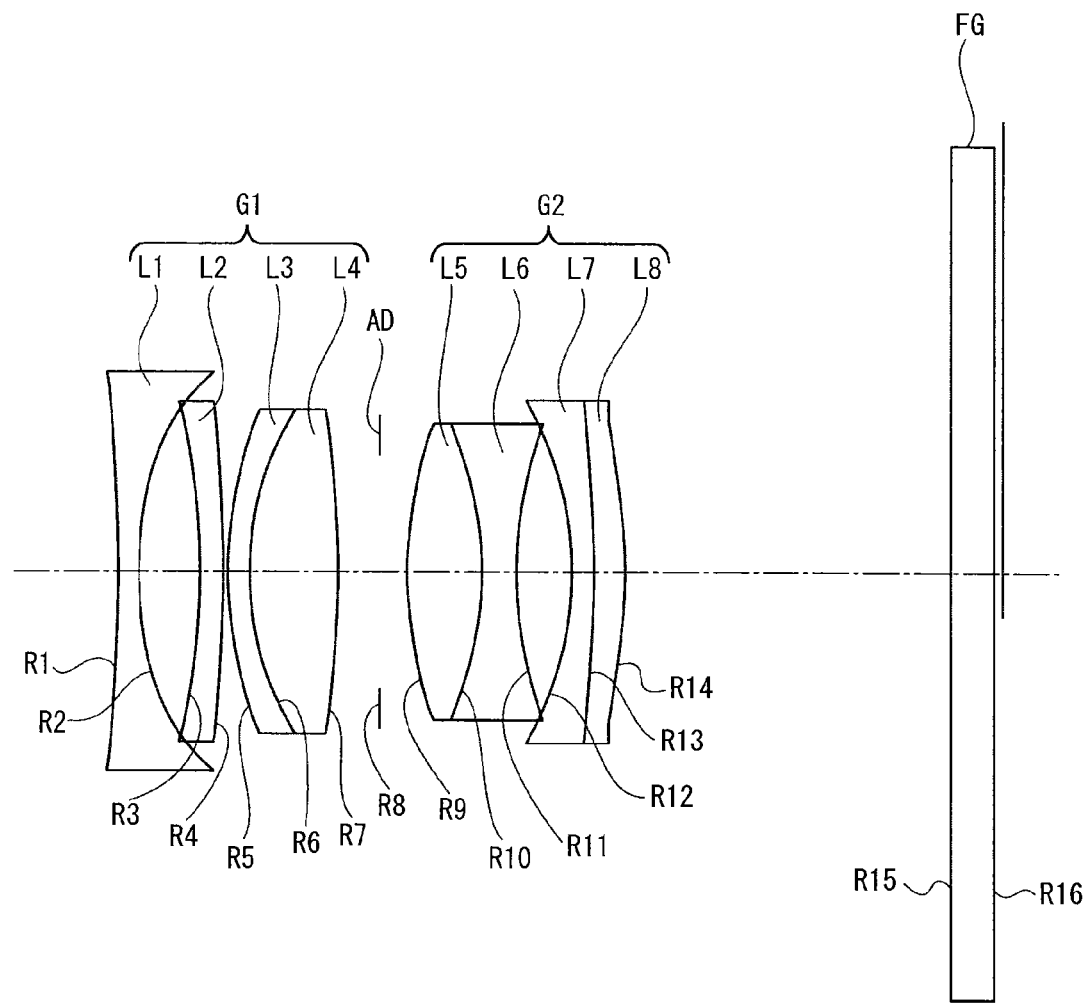
FIG. 13 is a vertical sectional diagram along an optical axis illustrating a construction of an optical system of an imaging lens of Example 7 according to an embodiment of the present invention.
Figure 14:
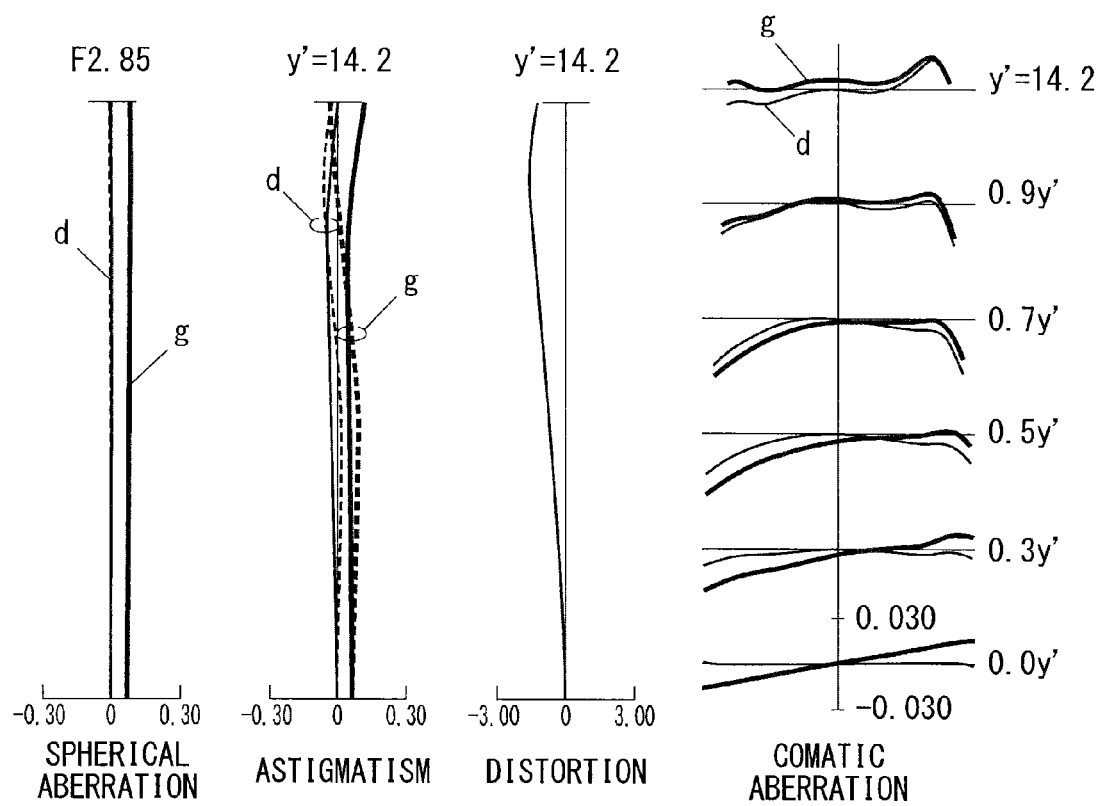
FIG. 14 illustrates aberration curve diagrams of spherical aberration, astigmatism, distortion, and comatic aberration regarding a d line and a g line in the imaging lens of Example 7 illustrated in FIG. 12.
Figure 15:
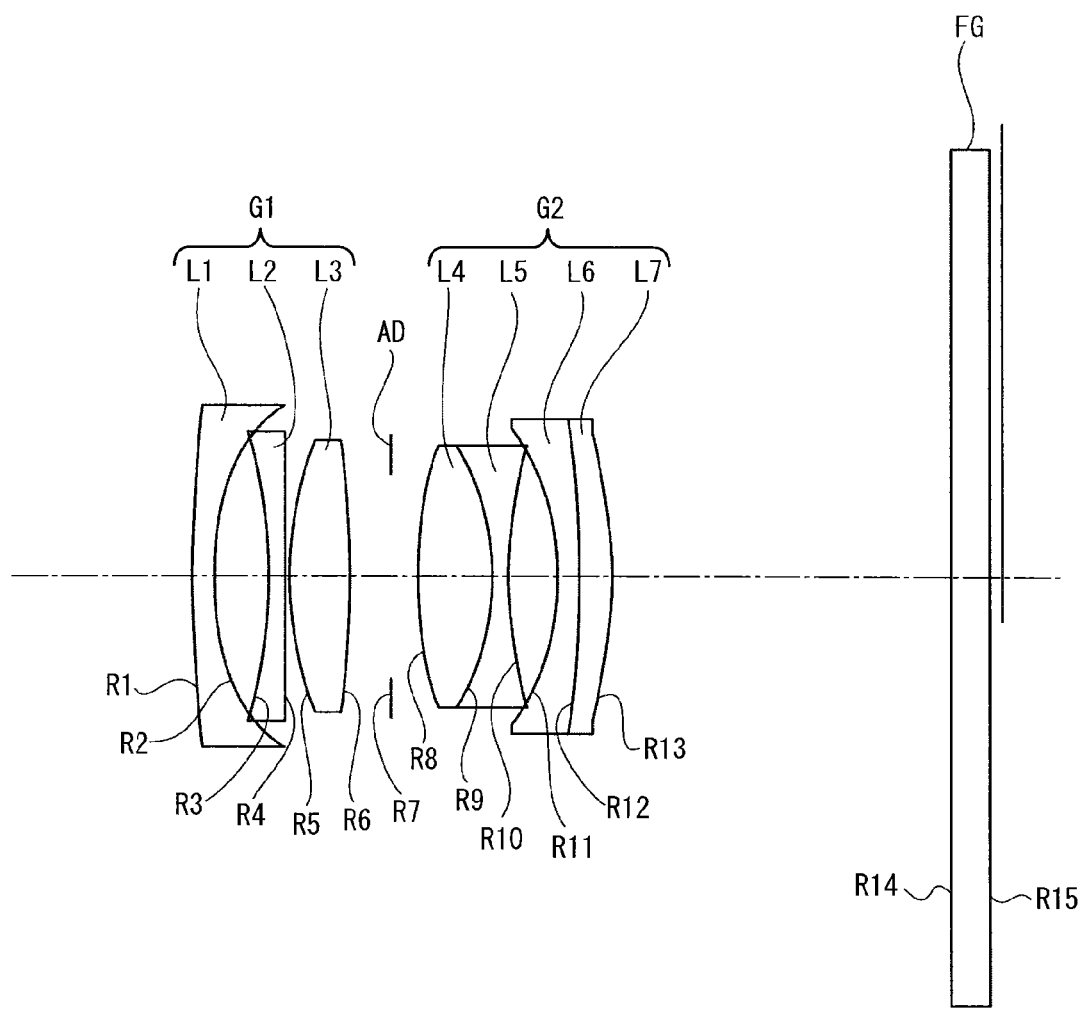
FIG. 15 is a vertical sectional diagram along an optical axis illustrating a construction of an optical system of an imaging lens of Example 8 according to an embodiment of the present invention.
Figure 16:
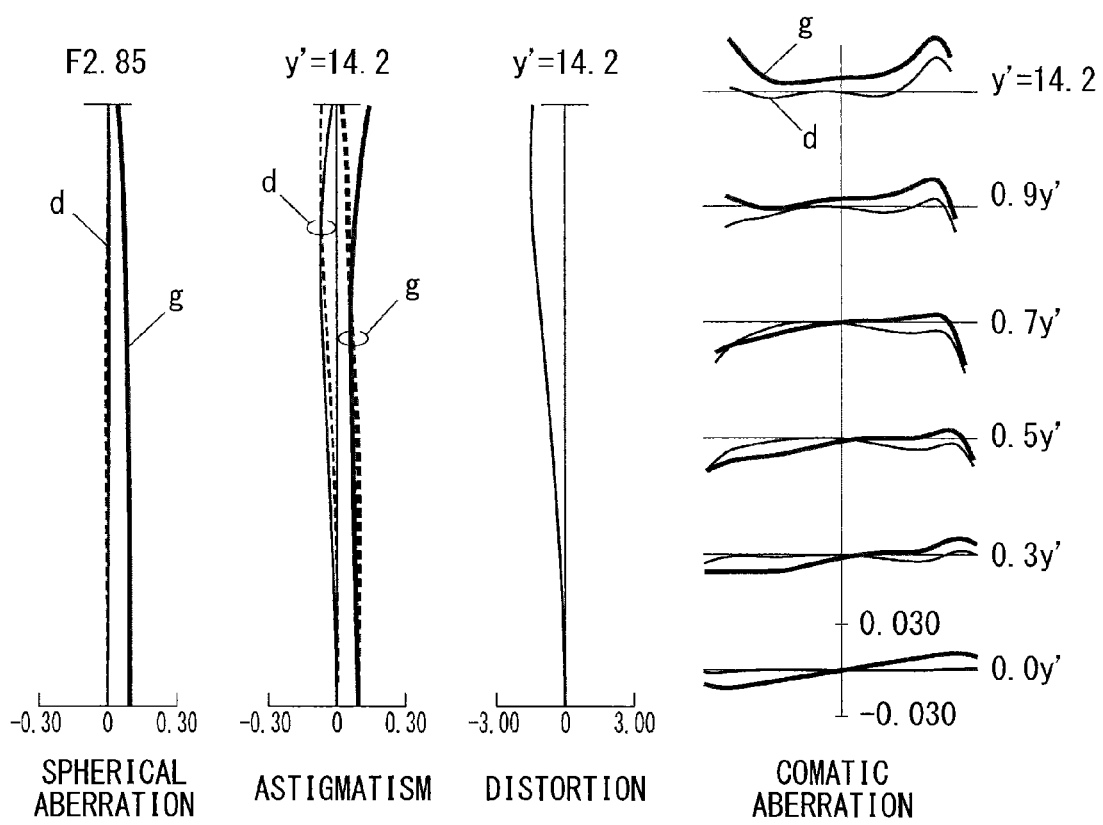
FIG. 16 illustrates aberration curve diagrams of spherical aberration, astigmatism, distortion, and comatic aberration regarding a d line and a g line in the imaging lens of Example 8 illustrated in FIG. 15.
Figure 17:
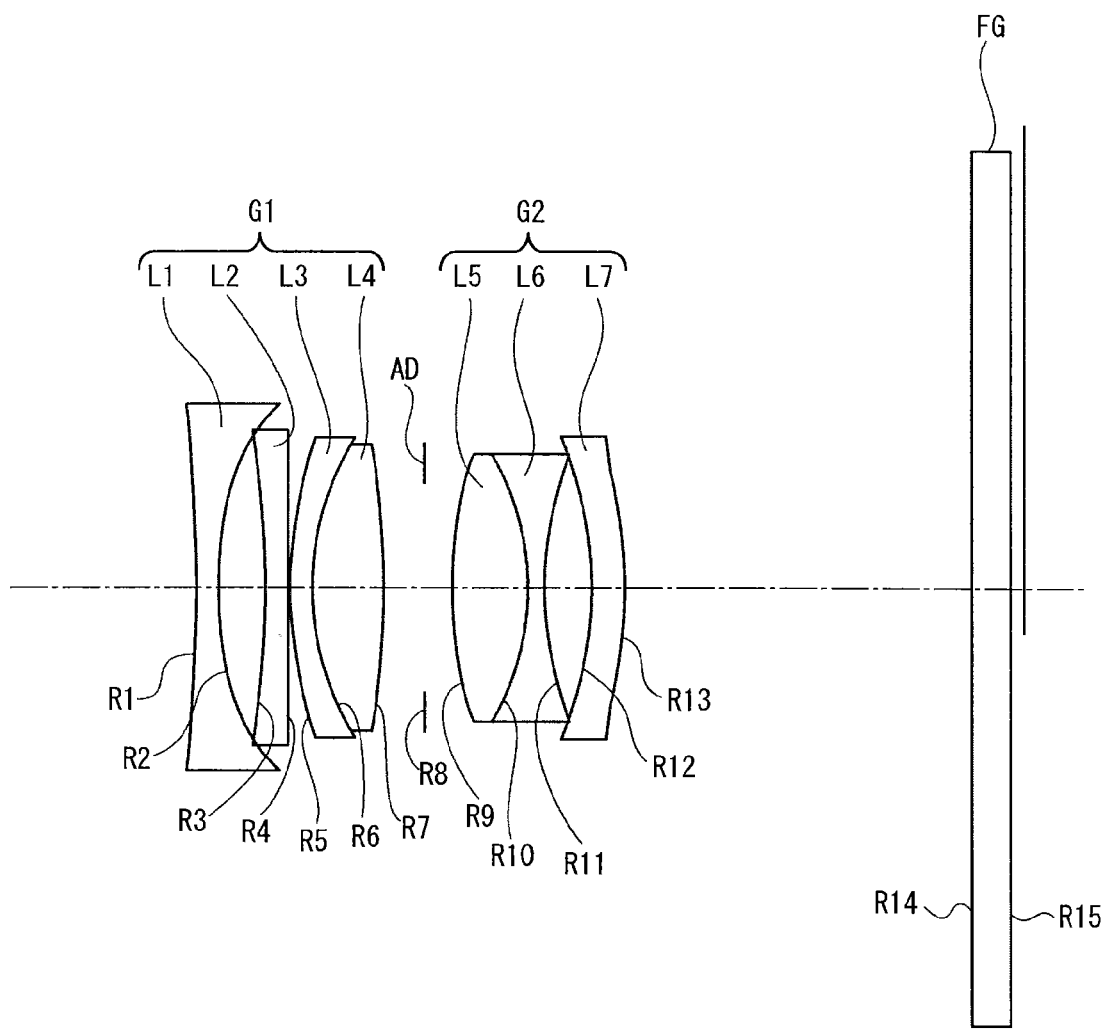
FIG. 17 is a vertical sectional diagram along an optical axis illustrating a construction of an optical system of an imaging lens of Example 9 according to an embodiment of the present invention.
Figure 18:
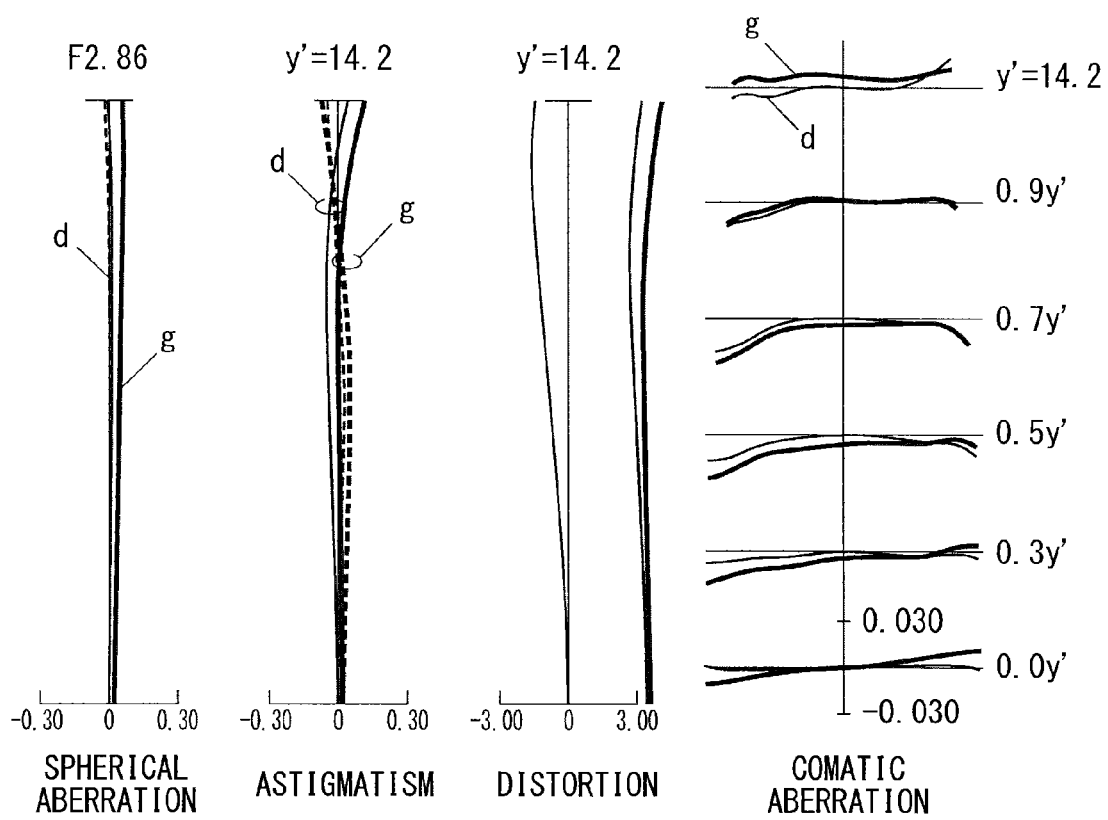
FIG. 18 illustrates aberration curve diagrams of spherical aberration, astigmatism, distortion, and comatic aberration regarding a d line and a g line in the imaging lens of Example 9 illustrated in FIG. 16.
Figure 19:
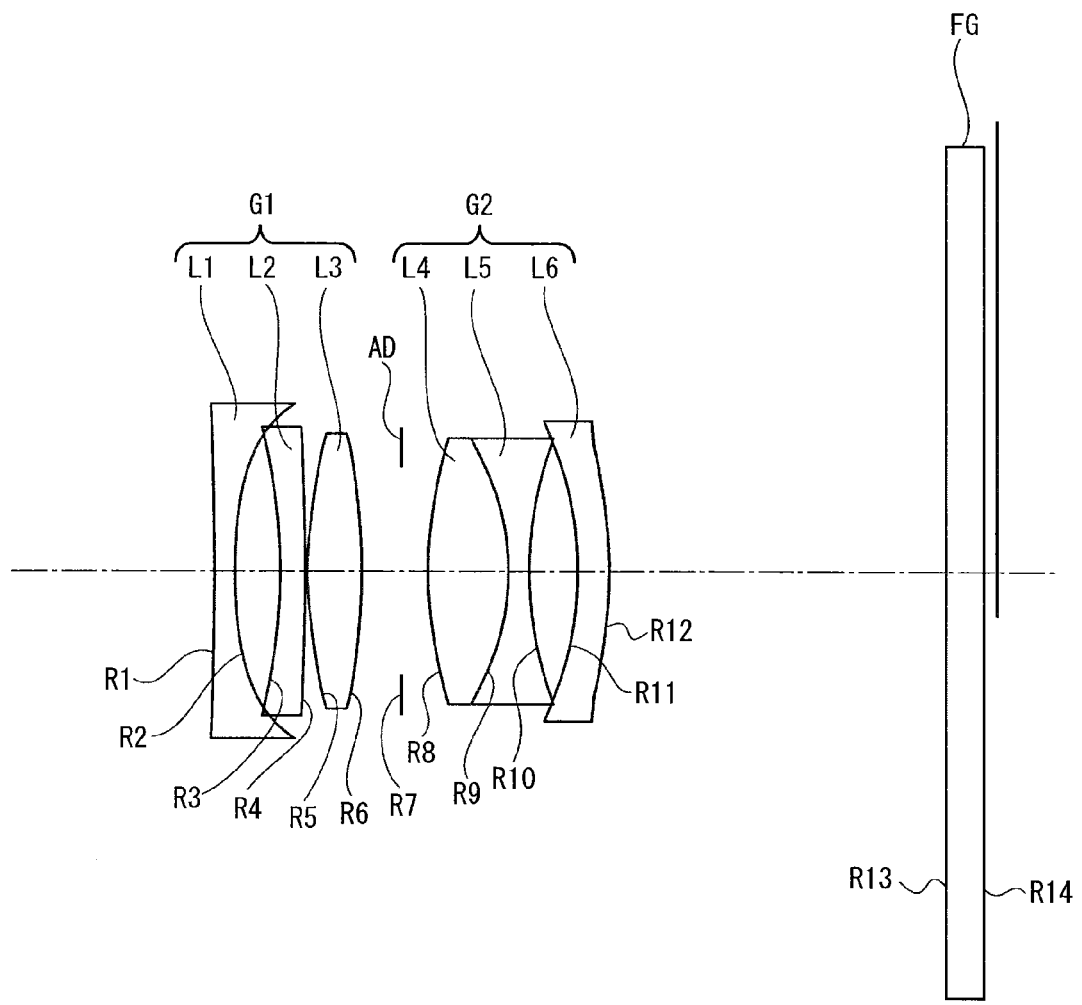
FIG. 19 is a vertical sectional diagram along an optical axis illustrating a construction of an optical system of an imaging lens of Example 10 according to an embodiment of the present invention.
Figure 20:
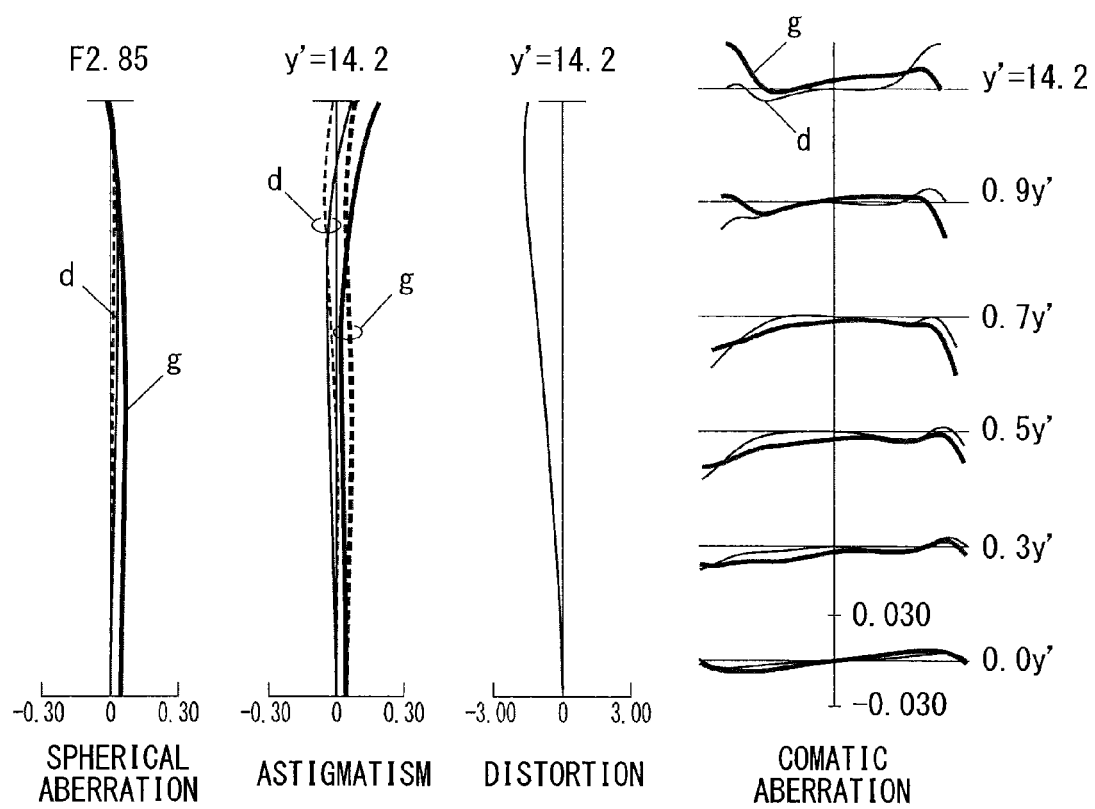
FIG. 20 illustrates aberration curve diagrams of spherical aberration, astigmatism, distortion, and comatic aberration regarding a d line and a g line in the imaging lens of Example 10 illustrated in FIG. 18.

Each of FIGS. 1 and 2 illustrates an imaging lens of Example 1 according to an embodiment of the present invention. Each of FIGS. 3 and 4 illustrates an imaging lens of Example 2 according to an embodiment of the present invention. Each of FIGS. 5 and 6 illustrates an imaging lens of Example 3 according to an embodiment of the present invention. Each of FIGS. 7 and 8 illustrates an imaging lens of Example 4 according to an embodiment of the present invention. Each of FIGS. 9 and 10 illustrates an imaging lens of Example 5 according to an embodiment of the present invention. Each of FIGS. 11 and 12 illustrates an imaging lens of Example 6 according to an embodiment of the present invention. Each of FIGS. 13 and 14 illustrates an imaging lens of Example 7 according to an embodiment of the present invention. Each of FIGS. 15 and 16 illustrates an imaging lens of Example 8 according to an embodiment of the present invention. Each of FIGS. 17 and 18 illustrates an imaging lens of Example 9 according to an embodiment of the present invention. Each of FIGS. 19 and 20 illustrates an imaging lens of Example 10 according to an embodiment of the present invention.

Note that in each of Examples 1 to 10, a maximum image height is 14.2 mm. In an imaging lens of each of Examples 1 to 10, as a parallel flat plate arranged on an image side of a rear lens group, a filter, for example, an optical low-pass filter, an infrared-cut filter, or the like, or a cover glass (seal glass) of a light-receiving element as a CMOS (Complementary Metal-Oxide Semiconductor) image sensor, or the like is envisaged. The parallel flat plate is arranged such that a surface on the image side of the parallel flat plate is in a position of approximately 0.5 mm on the object side from an imaging plane; however, it is not limited thereto. The parallel flat plate can be divided into a plurality of plates.

A material of an optical glass used in each of Examples 1 to 10 is an optical glass material product of HOYA CORPORATION (HOYA), OHARA INC. (OHARA), and Sumita Optical Glass, Inc. (SUMITA).

In each of Examples 1 to 10, aberration is corrected at a high level, and spherical aberration and axial chromatic aberration are extremely small. Astigmatism, field curvature, and lateral chromatic aberration are sufficiently small, and comatic aberration and disarrangement of a color difference thereof are favorably suppressed even in an outermost circumferential portion. Additionally, distortion is less than or equal to 2.0% in an absolute value.

It is clear from each of Examples 1 to 10 that by constructing an imaging lens as an embodiment of the present invention, it is possible to achieve an imaging lens that is wide-angle where a half angle of view is approximately 35-43 degrees, and has a large diameter where a smallest F-number is approximately F2.8, and additionally, achieves miniaturization in all of an entire length, an entire thickness, a diameter of the lens, and ensures extremely favorable image performance.

The meaning of each symbol in each of Examples 1 to 10 is as follows.

f: a focal length of an entire optical system
F: an F-number
ω: a half angle of view R: a curvature radius (a paraxial curvature radius in a case of an aspheric surface)
D: an interval between surfaces
Nd: a refractive index
vd: an Abbe number
$P_{g,F}$: a partial dispersion ratio
$P_{g,F} = (n_g - n_F)/(n_F - n_C)$ In each of Examples 1 to 10, some lens surfaces are aspheric surfaces. There are two types of constructions of an aspheric surface such as a mold aspheric lens where a lens surface is directly fabricated as an aspheric surface, and a so-called hybrid aspheric lens where a thin film of resin to form an aspheric surface is coated on a lens surface, and either can be used in each of Examples 1 to 10. Such a shape of an aspheric surface represents displacement in a direction of an optical axis at a position of height H from the optical axis when an apex of the surface is taken as reference (that is, an aspheric amount in the direction of the optical axis), which is denoted by X. X is defined by the following Expression [10], where a conic constant of an aspheric surface, an aspheric coefficient of the 4th order, an aspheric coefficient of the 6th order, an aspheric coefficient of the 8th order, an aspheric coefficient of the 10th order, and a reciprocal of the paraxial curvature radius R are denoted by K, $A_4$, $A_6$, $A_8$, $A_{10}$, and C, respectively.

$$X = \frac{CH^2}{1 + \sqrt{\{1 - (1+K)C^2H^2\}}} + A_4 \cdot H^4 + A_6 \cdot H^6 + A_8 \cdot H^8 + A_{10} \cdot H^{10} \quad [10]$$

Example 1

FIG. 1 is a vertical sectional diagram along the optical axis illustrating a lens construction of an imaging lens of Example 1 according to an embodiment of the present invention.

That is, as illustrated in FIG. 1, an optical system of the imaging lens of Example 1 includes a first lens L1, a second lens L2, a third lens L3, a fourth lens L4, an aperture AD, a fifth lens L5, a sixth lens L6, and a seventh lens L7, which are arranged in order from an object side to an image side. The third lens L3 and the fourth lens L4, and the fifth lens L5 and the sixth lens L6 are each formed as a cemented lens. The optical system of the imaging lens of Example 1 has a so-called 7-element in 5-group construction.

In terms of construction of a lens group, the first lens L1 to the fourth lens L4 are included in a first lens group G1, which has a positive refractive power, as a front lens group, and the fifth lens L5 to the seventh lens L7 are included in a second lens group G2, which has a positive refractive power, as a rear lens group.

That is, the optical system of the imaging lens illustrated in FIG. 1 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative biconcave lens having an aspheric concave surface on the image side where curvature of the aspheric concave surface on the object side. The second lens L2 is a negative meniscus lens having a concave surface on the object side. The third lens L3 is a negative meniscus lens having a convex surface on the object side. The fourth lens L4 is a positive biconvex lens where curvature of a convex surface on the object side is larger than that on the image side. The first lens group G1 is thus constructed to have the positive refractive power.

The third lens L3 and the fourth lens L4 are cemented together to be formed as a cemented lens of two cemented lenses.

The aperture AD is arranged between the first lens group G1 as the front lens group and the second lens group G2 as the rear lens group.

The second lens group G2 as the rear lens group includes the fifth lens L5, the sixth lens L6, and the seventh lens L7, which are arranged in order from the object side to the image side. The fifth lens L5 is a positive biconvex lens where curvature of a convex surface on the image side is larger than that on the object side. The sixth lens L6 is a negative biconcave lens where a concave surface on the object side is larger than that on the image side. The seventh lens L7 is a negative meniscus lens having a concave surface on the object side and an aspheric convex surface on the image side. The second lens group G2 is thus constructed to have the positive refractive power.

The fifth lens L5 and the sixth lens L6 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

As in a so-called digital still camera, in an imaging optical system using a solid-state image sensor such as a CCD (Charge-Coupled Device) image sensor, a CMOS (Complementary Metal-Oxide Semiconductor) image sensor, or the like, at least one of a back insertion glass, a low-pass filter, an infrared-cut glass, a cover glass to protect a light-receiving surface of the solid-state image sensor, and the like is inserted, and in the present example, representative of the above, the filter glass FG is illustrated equivalent to one parallel flat plate.

Note that also in each of later-described Examples 2 to 10, a filter glass FG is illustrated equivalent to one parallel flat plate, and as in the present example, the filter glass FG represents at least one of a back insertion glass, a low-pass filter, an infrared-cut glass, a cover glass, and the like.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 1, each surface number of each optical surface in the optical system of the imaging lens is also illustrated.

Note that in FIG. 1, each reference sign is independently used, that is, each reference sign is independently used in each vertical sectional diagram of an imaging lens according to an embodiment of the present invention, and therefore, even if a same reference sign is used in each of later-described Examples 2 to 10, a common element or construction is not always denoted.

In Example 1, a focal length of an entire optical system f, a smallest F-number F, and a half angle of view ω(degrees) are f=18.32, F=2.85, and ω=38.2, respectively.

The following Table 1 shows optical characteristics of each optical surface in Example 1. In the following Table 1, the optical characteristics such as a curvature radius of each optical surface (a paraxial curvature radius in a case of an aspheric surface) R, an interval between surfaces of adjacent optical surfaces D, a refractive index Nd, an Abbe number vd, a lens material (glass material), and the like are shown.

TABLE 1

Optical Characteristics

| SURFACE NUMBER | R | D | $N_d$ | $v_d$ | $P_{g,F}$ | NAME OF GLASS MATERIAL | REMARKS | |
|---|---|---|---|---|---|---|---|---|
| 1 | −35.692 | 0.80 | 1.58313 | 59.46 | 0.5404 | HOYA M-BACD12 | L 1 | G 1 |
| 2* | 20.888 | 1.33 | | | | | | |
| 3 | −20.058 | 0.80 | 1.71736 | 29.50 | 0.6033 | HOYA E-FD1 | L 2 | |
| 4 | −68.248 | 0.20 | | | | | | |
| 5 | 17.593 | 0.80 | 1.76182 | 26.61 | 0.6122 | HOYA FD140 | L 3 | |
| 6 | 9.640 | 2.44 | 1.83481 | 42.72 | 0.5653 | HOYA TAFD5F | L 4 | |
| 7 | −22.161 | 1.52 | | | | | | |
| 8 | APERTURE | 1.00 | | | | | A D | |
| 9 | 14.090 | 3.10 | 1.83481 | 42.72 | 0.5653 | HOYA TAFD5F | L 5 | G 2 |
| 10 | −9.782 | 0.81 | 1.67270 | 32.17 | 0.5962 | HOYA E-FD5 | L 6 | |
| 11 | 12.779 | 2.26 | | | | | | |
| 12 | −10.864 | 1.20 | 1.80610 | 40.73 | 0.5693 | HOYA M-NBFD130 | L 7 | |
| 13* | −12.678 | 11.730 | | | | | | |
| 14 | ∞ | 1.40 | 1.51680 | 64.20 | | FILTER | F G | |
| 15 | ∞ | | | | | | | |

In Table 1, a surface number with * (asterisk) represents an aspheric lens surface, and before a name of an optical glass material, a name of a manufacturer is described by use of an abbreviated name, and here, for example, HOYA denotes HOYA CORPORATION.

Note that the above is applied to each table of optical characteristics in each of later-described Examples 2 to 10.

In Table 1, each of a second surface (surface number 2) and a 13th surface (surface number 13) is an aspheric surface.

In Table 1, parameters of each aspheric surface in Expression [10] are as follows.

Parameters of Aspheric Surfaces
Second Surface
K=7.01177
$A_4$=1.70754×10$^{-4}$
$A_6$=−3.41940×10$^{-7}$
$A_8$=1.25705×10$^{-7}$
$A_{10}$=−2.19437×10$^{-9}$
13th Surface
K=−2.16285
$A_4$=1.26506×10$^{-4}$
$A_6$=3.79544×10$^{-6}$
$A_8$=8.67908×10$^{-8}$
$A_{10}$=−3.66733×10$^{-10}$ In this case, values corresponding to Conditional Expressions [1] to [9] are as follows. The following values satisfy Conditional Expressions [1] to [9], respectively.

$(r_{1o}+r_{2o})/(r_{1o}-r_{2o})$=0.020 [1]

$(r_{1i}+r_{2i})/(r_{1i}-r_{2i})$=0.081 [2]

$(r_{1s}+r_{2s})/(r_{1s}-r_{2s})$=0.223 [3]

$f_F/f_R$=0.733 [4]

$Y'/f$=0.775 [5]

$\tan(\theta P_{max})$=0.763 [6]

$L/f$=1.632 [7]

$D_T/f$=0.888 [8]

$f_{FF}/f_{RR}$=0.168 [9]

In FIG. 2, various aberrations in a d line and a g line of the imaging lens of Example 1, that is, aberration curve diagrams of spherical aberration, astigmatism, distortion, and comatic aberration are illustrated.

In FIG. 2, in the aberration curve diagrams, a dashed line in the spherical aberration expresses a sine condition, a solid line in the astigmatism expresses astigmatism in a sagittal plane, a dashed line in the astigmatism expresses astigmatism in a meridional plane, and reference signs d and g in the spherical aberration, astigmatism, and comatic aberration express a d line and a g line, respectively.

Note that the above is applied to aberration curve diagrams of each of later-described Examples 2 to 10.

Example 2

FIG. 3 is a vertical sectional diagram along the optical axis illustrating a lens construction of an imaging lens of Example 2 according to an embodiment of the present invention.

That is, as illustrated in FIG. 3, an optical system of the imaging lens of Example 2 includes a first lens L1, a second lens L2, a third lens L3, an aperture AD, a fourth lens L4, a fifth lens L5, and a sixth lens L6, which are arranged in order from the object side to the image side. The fourth lens L4 and the fifth lens L5 are formed as a cemented lens, and the optical system of the imaging lens of Example 2 has a so-called 6-element in 5-group construction.

In terms of construction of a lens group, the first lens L1 to the third lens L3 are included in a first lens group G1, which has a positive refractive power, as a front lens group, and the fourth lens L4 to the sixth lens L6 are included in a second lens group G2, which has a positive refractive power, as a rear lens group.

That is, the optical system of the imaging lens illustrated in FIG. 3 includes the first lens group G1, the aperture AD, and the second lens group G2, which are arranged in order from the object side to the image side.

Specifically, the first lens group G1 as the front lens group includes the first lens L1, the second lens L2, and the third lens L3, which are arranged in order from the object side to the image side. The first lens L1 is a negative biconcave lens having an aspheric concave surface on the image side where curvature of the aspheric concave surface on the image side is larger than that of a concave surface on the object side. The second lens L2 is a negative meniscus lens having a concave surface on the object side. The third lens L3 is a positive biconvex lens where curvature of a convex surface on the object side is larger than that on the image side. The first lens group G1 is thus constructed to have the positive refractive power.

The aperture AD is arranged between the first lens group G1 as the front lens group and the second lens group G2 as the rear lens group.

The second lens group G2 as the rear lens group includes the fourth lens L4, the fifth lens group L5, and the sixth lens L6, which are arranged in order from the object side to the image side. The fourth lens L4 is a positive biconvex lens where curvature of a convex surface on the image side is larger than that on the object side. The fifth lens L5 is a negative biconcave lens where curvature of a concave surface on the object side is larger than that on the image side. The sixth lens L6 is a negative meniscus lens having a concave surface on the object side and an aspheric convex surface on the image side. The second lens group G2 is thus constructed to have the positive refractive power.

The fourth lens L4 and the fifth lens L5 are cemented together to be formed as a cemented lens of two cemented lenses.

Between the first lens L1 and the second lens L2 in the first lens group G1 as the front lens group, a biconvex air lens is formed. Between the fifth lens L5 and the sixth lens L6 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 3, each surface number of each optical surface in the optical system of the imaging lens is also illustrated.

In Example 2, a focal length of an entire optical system f, a smallest F-number F, and a half angle of view ω (degrees) are f=18.34, F=2.88, and ω=38.2, respectively.

The following Table 2 shows optical characteristics of each optical surface in Example 2. In the following Table 2, the optical characteristics such as a curvature radius of each optical surface (a paraxial curvature radius in a case of an aspheric surface) R, an interval between surfaces of adjacent optical surfaces D, a refractive index Nd, an Abbe number vd, a lens material (glass material), and the like are shown.

TABLE 2

Optical Characteristics

| SURFACE NUMBER | R | D | $N_d$ | $v_d$ | $P_{g.F}$ | NAME OF GLASS MATERIAL | REMARKS | |
|---|---|---|---|---|---|---|---|---|
| 1 | −36.757 | 0.80 | 1.48749 | 70.45 | 0.5306 | HOYA FC5 | L 1 | G 1 |
| 2* | 14.461 | 1.79 | | | | | | |
| 3 | −19.505 | 0.80 | 1.84666 | 23.78 | 0.6191 | HOYA FDS90 | L 2 | |
| 4 | −45.354 | 0.20 | | | | | | |
| 5 | 16.326 | 2.54 | 1.77250 | 49.62 | 0.5503 | HOYA TAF1 | L 3 | |
| 6 | −22.028 | 1.52 | | | | | | |
| 7 | APERTURE | 1.00 | | | | | A D | |
| 8 | 13.757 | 2.89 | 1.83481 | 42.72 | 0.5653 | HOYA TAFD5F | L 4 | G 2 |
| 9 | −8.979 | 1.65 | 1.68893 | 31.16 | 0.5989 | HOYA E-FD8 | L 5 | |
| 10 | 13.233 | 1.86 | | | | | | |
| 11 | −12.445 | 1.20 | 1.83441 | 37.28 | 0.5772 | HOYA M-NBFD10 | L 6 | |
| 12* | −13.926 | 12.441 | | | | | | |
| 13 | ∞ | 1.40 | 1.51680 | 64.20 | | FILTER | F G | |
| 14 | ∞ | | | | | | | |

In Table 2, each of a second surface (surface number 2) and a 12th surface (surface number 12) is an aspheric surface.

In Table 2, parameters of each aspheric surface in Expression [10] are as follows.

Parameters of Aspheric Surfaces
Second Surface
K=3.79018
$A_4$=1.47147×10$^{-4}$
$A_6$=−1.66166×10$^{-6}$
$A_8$=1.59220×10$^{-7}$
$A_{10}$=−3.48523×10$^{-9}$
12th Surface
K=−2.38795
$A_4$=1.75179×10$^{-4}$
$A_6$=4.15425×10$^{-6}$
$A_8$=1.26254×10$^{-7}$
$A_{10}$=−7.36910×10$^{-10}$ In this case, values corresponding to Conditional Expressions [1] to [9] are as follows. The following values satisfy Conditional Expressions [1] to [9], respectively.

$(r_{1o}+r_{2o})/(r_{1o}-r_{2o})=-0.149$ [1]

$(r_{1i}+r_{2i})/(r_{1i}-r_{2i})=0.031$ [2]

$(r_{1s}+r_{2s})/(r_{1s}-r_{2s})=0.231$ [3]

$f_F/f_R=1.243$ [4]

$Y'/f=0.774$ [5]

$\tan(\theta P_{max})=0.749$ [6]

$L/f=1.668$ [7]

$D_T/f=0.886$ [8]

$f_{FF}/f_{RR}=0.095$ [9]

In FIG. 4, various aberrations in a d line and a g line of the imaging lens of Example 2, that is, aberration curve diagrams of spherical aberration, astigmatism, distortion, and comatic aberration are illustrated.

Example 3

FIG. 5 is a vertical sectional diagram along the optical axis illustrating a lens construction of an imaging lens of Example 3 according to an embodiment of the present invention.

That is, as illustrated in FIG. 5, an optical system of the imaging lens of Example 3 includes a first lens L1, a second lens L2, a third lens L3, a fourth lens L4, an aperture AD, a fifth lens L5, a sixth lens L6, and a seventh lens L7, which are arranged in order from the object side to the image side.

The third lens L3 and the fourth lens L4, and the fifth lens L5 and the sixth lens L6 are each formed as a cemented lens. The optical system of the imaging lens of Example 3 has a so-called 7-element in 5-group construction.

In terms of construction of a lens group, the first lens L1 to the fourth lens L4 are included in a first lens group G1, which has a positive refractive power, as a front lens group, and the fifth lens L5 to the seventh lens L7 are included in a second lens group G2, which has a positive refractive power, as a rear lens group.

That is, the optical system of the imaging lens illustrated in FIG. 5 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative meniscus lens having an aspheric concave surface on the image side and a convex surface on the object side. The second lens L2 is a negative biconcave lens having a strongly concave surface on the object side. The third lens L3 is a negative meniscus lens having a convex surface on the object side. The fourth lens L4 is a positive biconvex lens where curvature of a convex surface on the object side is larger than that on the image side. The first lens group G1 is thus constructed to have the positive refractive power.

The third lens L3 and the fourth lens L4 are cemented together to be formed as a cemented lens of two cemented lenses.

Between the first lens group G1 as the front lens group and the second lens group G2 as the rear lens group, the aperture AD is arranged.

The second lens group G2 as the rear lens group includes the fifth lens L5, the sixth lens L6, and the seventh lens L7, which are arranged in order from the object side to the image side. The fifth lens L5 is a positive biconvex lens where curvature of a convex surface on the image side is larger than that on the object side. The sixth lens L6 is a negative biconcave lens where curvature of a concave surface on the object side is larger than that on the image side. The seventh lens L7 is a negative meniscus lens having a concave surface on the object side and an aspheric convex surface on the image side. The second lens group G2 is thus constructed to have the positive refractive power.

The fifth lens L5 and the sixth lens L6 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 5, each surface number of each optical surface in the optical system of the imaging lens is also illustrated.

In Example 3, a focal length of an entire optical system f, a smallest F-number F, and a half angle of view ω (degrees) are f=18.30, F=2.81, and ω=38.2, respectively.

The following Table 3 shows optical characteristics of each optical surface in Example 3. In the following Table 3, the optical characteristics such as a curvature radius of each optical surface (a paraxial curvature radius in a case of an aspheric surface) R, an interval between surfaces of adjacent optical surfaces D, a refractive index Nd, an Abbe number νd, a lens material (glass material), and the like are shown.

TABLE 3

| | | Optical Characteristics | | | | | | |
|---|---|---|---|---|---|---|---|---|
| SURFACE NUMBER | R | D | $N_d$ | $\nu_d$ | $P_{g,F}$ | NAME OF GLASS MATERIAL | REMARKS | |
| 1 | 816.141 | 0.80 | 1.49710 | 81.56 | 0.5388 | HOYA M-FCD1 | L 1 | G 1 |
| 2* | 13.666 | 1.79 | | | | | | |
| 3 | −23.543 | 0.80 | 1.68893 | 31.16 | 0.5989 | HOYA E-FD8 | L 2 | |
| 4 | 200.425 | 0.20 | | | | | | |
| 5 | 15.416 | 0.80 | 1.84666 | 23.78 | 0.6191 | HOYA FDS90 | L 3 | |
| 6 | 9.513 | 2.34 | 1.88300 | 40.80 | 0.5654 | HOYA TAFD30 | L 4 | |
| 7 | −34.121 | 1.50 | | | | | | |
| 8 | APERTURE | 1.00 | | | | | A D | |
| 9 | 14.691 | 2.59 | 1.88300 | 40.80 | 0.5654 | HOYA TAFD30 | L 5 | G 2 |
| 10 | −9.087 | 0.89 | 1.68893 | 31.16 | 0.5989 | HOYA E-FD8 | L 6 | |
| 11 | 12.917 | 1.73 | | | | | | |
| 12 | −12.419 | 1.20 | 1.82080 | 42.71 | 0.5642 | HOYA M-TAFD51 | L 7 | |

TABLE 3-continued

Optical Characteristics

| SURFACE NUMBER | R | D | $N_d$ | $v_d$ | $P_{g,F}$ | NAME OF GLASS MATERIAL | REMARKS |
|---|---|---|---|---|---|---|---|
| 13* | −13.832 | 12.756 | | | | | |
| 14 | ∞ | 1.40 | 1.51680 | 64.20 | | FILTER | F G |
| 15 | ∞ | | | | | | |

In Table 3, each of a second surface (surface number 2) and a 13th surface (surface number 13) is an aspheric surface.

In Table 3, parameters of each aspheric surface in Expression [10] are as follows.

Parameters of Aspheric Surfaces
Second Surface
K=3.80085
$A_4$=1.07069×10$^{-4}$
$A_6$=−3.38949×10$^{-6}$
$A_8$=2.19205×10$^{-7}$
$A_{10}$=−5.16455×10$^{-9}$
13th Surface
K=−2.86234
$A_4$=1.49055×10$^{-4}$
$A_6$=4.18583×10$^{-6}$
$A_8$=1.25343×10$^{-7}$
$A_{10}$=−7.88154×10$^{-10}$ In this case, values corresponding to Conditional Expressions [1] to [9] are as follows. The following values satisfy Conditional Expressions [1] to [9], respectively.

$$(r_{1o}+r_{2o})/(r_{1o}-r_{2o})=-0.265 \quad [1]$$

$$(r_{1i}+r_{2i})/(r_{1i}-r_{2i})=0.020 \quad [2]$$

$$(r_{1s}+r_{2s})/(r_{1s}-r_{2s})=0.398 \quad [3]$$

$$f_F/f_R=1.203 \quad [4]$$

$$Y'/f=0.776 \quad [5]$$

$$\tan(\theta P_{max})=0.746 \quad [6]$$

$$L/f=1.656 \quad [7]$$

$$D_T/f=0.855 \quad [8]$$

$$f_{FF}/f_{RR}=0.117 \quad [9]$$

In FIG. 6, various aberrations in a d line and a g line of the imaging lens of Example 3, that is, aberration curve diagrams of spherical aberration, astigmatism, distortion, and comatic aberration are illustrated.

Example 4

FIG. 7 is a vertical sectional diagram along the optical axis illustrating a lens construction of an imaging lens of Example 4 according to an embodiment of the present invention.

That is, as illustrated in FIG. 7, an optical system of the imaging lens of Example 4 includes a first lens L1, a second lens L2, a third lens L3, a fourth lens L4, an aperture AD, a fifth lens L5, a sixth lens L6, and a seventh lens L7, which are arranged in order from the object side to the image side.

The third lens L3 and the fourth lens L4, and the fifth lens L5 and the sixth lens L6 are each formed as a cemented lens. The optical system of the imaging lens of Example 4 has a so-called 7-element in 5-group construction.

In terms of construction of a lens group, the first lens L1 to the fourth lens L4 are included in a first lens group G1, which has a positive refractive power, as a front lens group, and the fifth lens L5 to the seventh lens L7 are included in a second lens group G2, which has a positive refractive power, as a rear lens group.

That is, the optical system of the imaging lens illustrated in FIG. 7 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative meniscus lens having an aspheric concave surface on the image side and a convex surface on the object side. The second lens L2 is a negative biconcave lens where curvature of a concave surface on the object side is larger than that on the image side. The third lens L3 is a negative meniscus lens having a convex surface on the object side. The fourth lens L4 is a positive biconvex lens where curvature of a convex surface on the object side is larger than that on the image side. The first lens group G1 is thus constructed to have the positive refractive power.

The third lens L3 and the fourth lens L4 are cemented together to be formed as a cemented lens of two cemented lenses.

Between the first lens group G1 as the front lens group and the second lens group G2 as the rear lens group, the aperture AD is arranged.

The second lens group G2 as the rear lens group includes the fifth lens L5, the sixth lens L6, and the seventh lens L7, which are arranged in order from the object side to the image side. The fifth lens L5 is a positive biconvex lens where curvature of a convex surface on the image side is larger than that on the object side. The sixth lens L6 is a negative biconcave lens where curvature of a concave surface on the object side is larger than that on the image side. The seventh lens L7 is a negative meniscus lens having a concave surface on the object side and an aspheric convex surface on the image side. The second lens group G2 is thus constructed to have the positive refractive power.

The fifth lens L5 and the sixth lens L6 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 7, each surface number of each optical surface in the optical system of the imaging lens is also illustrated.

In Example 4, a focal length of an entire optical system f, a smallest F-number F, and a half angle of view ω (degrees) are f=18.32, F=2.82, and ω=38.2, respectively.

The following Table 4 shows optical characteristics of each optical surface in Example 4. In the following Table 4, the optical characteristics such as a curvature radius of each optical surface (a paraxial curvature radius in a case of an aspheric surface) R, an interval between surfaces of adjacent optical surfaces D, a refractive index Nd, an Abbe number vd, a lens material (glass material), and the like are shown.

TABLE 4

Optical Characteristics

| SURFACE NUMBER | R | D | $N_d$ | $v_d$ | $P_{g,F}$ | NAME OF GLASS MATERIAL | REMARKS | |
|---|---|---|---|---|---|---|---|---|
| 1 | 50.000 | 0.80 | 1.48749 | 70.45 | 0.5306 | HOYA FC5 | L 1 | G 1 |
| 2* | 12.233 | 2.72 | | | | | | |
| 3 | −24.379 | 0.80 | 1.62588 | 35.74 | 0.5877 | HOYA E-F1 | L 2 | |
| 4 | 77.306 | 0.20 | | | | | | |
| 5 | 16.097 | 0.80 | 1.80518 | 25.46 | 0.6156 | HOYA FD60 | L 3 | |
| 6 | 9.256 | 2.39 | 1.88300 | 40.80 | 0.5654 | HOYA TAFD30 | L 4 | |
| 7 | −37.720 | 1.51 | | | | | | |
| 8 | APERTURE | 1.00 | | | | | A D | |
| 9 | 14.655 | 2.44 | 1.88300 | 40.80 | 0.5654 | HOYA TAFD30 | L 5 | G 2 |
| 10 | −9.325 | 0.80 | 1.68893 | 31.16 | 0.5989 | HOYA E-FD8 | L 6 | |
| 11 | 12.454 | 1.59 | | | | | | |
| 12 | −13.674 | 1.20 | 1.82080 | 42.71 | 0.5642 | HOYA M-TAFD51 | L 7 | |
| 13* | −15.035 | 13.084 | | | | | | |
| 14 | ∞ | 1.40 | 1.51680 | 64.20 | | FILTER | F G | |
| 15 | ∞ | | | | | | | |

In Table 4, each of a second surface (surface number 2) and a 13th surface (surface number 13) is an aspheric surface.

In Table 4, parameters of each aspheric surface in Expression [10] are as follows.

Parameters of Aspheric Surfaces
Second Surface
K=2.13028
$A_4$=9.86836×10$^{-5}$
$A_6$=−9.74939×10$^{-8}$
$A_8$=4.88682×10$^{-8}$
$A_{10}$=−1.11860×10$^{-10}$
13th Surface
K=−2.63168
$A_4$=1.86803×10$^{-4}$
$A_6$=3.76968×10$^{-6}$
$A_8$=1.35267×10$^{-7}$
$A_{10}$=−1.07927×10$^{-9}$ In this case, values corresponding to Conditional Expressions [1] to [9] are as follows. The following values satisfy Conditional Expressions [1] to [9], respectively.

$(r_{1o}+r_{2o})/(r_{1o}-r_{2o})=-0.332$ [1]

$(r_{1i}+r_{2i})/(r_{1i}-r_{2i})=-0.047$ [2]

$(r_{1s}+r_{2s})/(r_{1s}-r_{2s})=0.440$ [3]

$f_F/f_R=1.059$ [4]

$Y'/f=0.775$ [5]

$\tan(\theta P_{max})=0.751$ [6]

$L/f=1.705$ [7]

$D_T/f=0.887$ [8]

$f_{FF}/f_{RR}=0.110$ [9]

In FIG. 8, various aberrations in a d line and a g line of the imaging lens of Example 4, that is, aberration curve diagrams of spherical aberration, astigmatism, distortion, and comatic aberration are illustrated.

Example 5

FIG. 9 is a vertical sectional diagram along the optical axis illustrating a lens construction of an imaging lens of Example 5 according to an embodiment of the present invention.

That is, as illustrated in FIG. 9, an optical system of the imaging lens of Example 5 includes a first lens L1, a second lens L2, a third lens L3, a fourth lens L4, an aperture AD, a fifth lens L5, a sixth lens L6, and a seventh lens L7, which are arranged in order from the object side to the image side.

The third lens L3 and the fourth lens L4, and the fifth lens L5 and the sixth lens L6 are each formed as a cemented lens. The optical system of the imaging lens of Example 5 has a so-called 7-element in 5-group construction.

In terms of construction of a lens group, the first lens L1 to the fourth lens L4 are included in a first lens group G1, which has a positive refractive power, as a front lens group, and the fifth lens L5 to the seventh lens L7 are included in a second lens group G2, which has a positive refractive power, as a rear lens group.

That is, the optical system of the imaging lens illustrated in FIG. 9 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative biconcave lens having an aspheric concave surface on the image side where curvature of the aspheric concave surface on the image side is larger than that of a concave surface on the object side. The second lens L2 is a negative meniscus lens having a concave surface on the object side. The third lens L3 is a positive biconvex lens where curvature of a convex surface on the image side is somewhat larger than that on the object side. The fourth lens L4 is a negative meniscus lens having a convex surface on the image side. The first lens group G1 is thus constructed to have the positive refractive power.

The third lens L3 and the fourth lens L4 are cemented together to be formed as a cemented lens of two cemented lenses.

Between the first lens group G1 as the front lens group and the second lens group G2 as the rear lens group, the aperture AD is arranged.

The second lens group G2 as the rear lens group includes the fifth lens L5, the sixth lens L6, and the seventh lens L7, which are arranged in order from the object side to the image side. The fifth lens L5 is a positive biconvex lens where curvature of a convex surface on the image side is larger than that on the object side. The sixth lens L6 is a negative biconcave lens where curvature of a concave surface on the object side is larger than that on the image side. The seventh lens L7 is a negative meniscus lens having a concave surface on the object side and an aspheric convex surface on the image side. The second lens group G2 is thus constructed to have the positive refractive power.

The fifth lens L5 and the sixth lens L6 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 9, each surface number of each optical surface in the optical system of the imaging lens is also illustrated.

In Example 5, a focal length of an entire optical system f, a smallest F-number F, and a half angle of view ω (degrees) are f=18.34, F=2.86, and ω=38.2, respectively.

The following Table 5 shows optical characteristics of each optical surface in Example 5. In the following Table 5, the optical characteristics such as a curvature radius of each optical surface (a paraxial curvature radius in a case of an aspheric surface) R, an interval between surfaces of adjacent optical surfaces D, a refractive index Nd, an Abbe number vd, a lens material (glass material), and the like are shown.

TABLE 5

Optical Characteristics

| SURFACE NUMBER | R | D | $N_d$ | $v_d$ | $P_{g,F}$ | NAME OF GLASS MATERIAL | REMARKS | |
|---|---|---|---|---|---|---|---|---|
| 1 | −51.599 | 0.80 | 1.48749 | 70.45 | 0.5306 | HOYA FC5 | L 1 | G 1 |
| 2* | 16.200 | 1.62 | | | | | | |
| 3 | −20.195 | 0.80 | 1.74077 | 27.76 | 0.6076 | HOYA E-FD13 | L 2 | |
| 4 | −77.866 | 0.20 | | | | | | |
| 5 | 17.381 | 2.39 | 1.83481 | 42.72 | 0.5653 | HOYA TAFD5F | L 3 | |
| 6 | −14.223 | 0.80 | 1.76182 | 26.61 | 0.6122 | HOYA FD140 | L 4 | |
| 7 | −26.356 | 1.51 | | | | | | |
| 8 | APERTURE | 1.00 | | | | | A D | |
| 9 | 13.693 | 3.11 | 1.83481 | 42.72 | 0.5653 | HOYA TAFD5F | L 5 | G 2 |
| 10 | −8.619 | 0.80 | 1.67270 | 32.17 | 0.5962 | HOYA E-FD5 | L 6 | |
| 11 | 12.644 | 2.02 | | | | | | |
| 12 | −12.120 | 1.20 | 1.80610 | 40.73 | 0.5693 | HOYA M-NBFD130 | L 7 | |
| 13* | −13.772 | 12.28 | | | | | | |
| 14 | ∞ | 1.40 | 1.51680 | 64.20 | | FILTER | F G | |
| 15 | ∞ | | | | | | | |

In Table 5, each of a second surface (surface number 2) and a 13th surface (surface number 13) is an aspheric surface.

In Table 5, parameters of each aspheric surface in Expression [10] are as follows.

Parameters of Aspheric Surfaces
Second Surface
K=3.42630
$A_4$=1.82031×10$^{-4}$
$A_6$=2.87806×10$^{-8}$
$A_8$=1.09332×10$^{-7}$
$A_{10}$=−1.19134×10$^{-9}$
13th Surface
K=−2.05587
$A_4$=1.76087×10$^{-4}$
$A_6$=3.91574×10$^{-6}$
$A_8$=1.04887×10$^{-7}$
$A_{10}$=−4.66251×10$^{-10}$ In this case, values corresponding to Conditional Expressions [1] to [9] are as follows. The following values satisfy Conditional Expressions [1] to [9], respectively.

$(r_{1o}+r_{2o})/(r_{1o}-r_{2o})$=−0.110  [1]

$(r_{1i}+r_{2i})/(r_{1i}-r_{2i})$=0.021  [2]

$(r_{1s}+r_{2s})/(r_{1s}-r_{2s})$=0.316  [3]

$f_F/f_R$=1.097  [4]

$Y'/f$=0.774  [5]

$\tan(\theta P_{max})$=0.749  [6]

$L/f=1.659$ [7]

$D_T/f=0.886$ [8]

$f_{FF}/f_{RR}=0.136$ [9]

In FIG. 10, various aberrations in a d line and a g line of the imaging lens of Example 5, that is, aberration curve diagrams of spherical aberration, astigmatism, distortion, and comatic aberration are illustrated.

Example 6

FIG. 11 is a vertical sectional diagram along the optical axis illustrating a lens construction of an imaging lens of Example 6 according to an embodiment of the present invention.

That is, as illustrated in FIG. 11, an optical system of the imaging lens of Example 6 includes a first lens L1, a second lens L2, a third lens L3, a fourth lens L4, an aperture AD, a fifth lens L5, a sixth lens L6, and a seventh lens L7, which are arranged in order from the object side to the image side.

The third lens L3 and the fourth lens L4, and the fifth lens L5 and the sixth lens L6 are each formed as a cemented lens. The optical system of the imaging lens of Example 6 has a so-called 7-element in 5-group construction.

In terms of construction of a lens group, the first lens L1 to the fourth lens L4 are included in a first lens group G1, which has a positive refractive power, as a front lens group, and the fifth lens L5 to the seventh lens L7 are included in a second lens group G2, which has a positive refractive power, as a rear lens group.

That is, the optical system of the imaging lens illustrated in FIG. 11 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative meniscus lens having an aspheric concave surface on the image side and a convex surface on the object side. The second lens L2 is a negative meniscus lens having a concave surface on the object side. The third lens L3 is a negative meniscus lens having a convex surface on the object side. The fourth lens L4 is a positive biconvex lens where curvature of a convex surface on the object side is larger than that on the image side. The first lens group G1 is thus constructed to have the positive refractive power.

The third lens L3 and the fourth lens L4 are cemented together to be formed as a cemented lens of two cemented lenses.

Between the first lens group G1 as the front lens group and the second lens group G2 as the rear lens group, the aperture AD is arranged.

The second lens group G2 as the rear lens group includes the fifth lens L5, the sixth lens L6, and the seventh lens L7, which are arranged in order from the object side to the image side. The fifth lens L5 is a positive biconvex lens where curvature of a convex surface on the image side is larger than that on the object side. The sixth lens L6 is a negative biconcave lens where curvature of a concave surface on the image side is larger than that on the object side. The seventh lens L7 is a negative meniscus lens having a concave surface on the object side and an aspheric convex surface on the image side. The second lens group G2 is thus constructed to have the positive refractive power.

The fifth lens L5 and the sixth lens L6 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 11, each surface number of each optical surface in the optical system of the imaging lens is also illustrated.

In Example 6, a focal length of an entire optical system f, a smallest F-number F, and a half angle of view ω (degrees) are f=15.72, F=2.86, and ω=42.4, respectively.

The following Table 6 shows optical characteristics of each optical surface in Example 6. In the following Table 6, the optical characteristics such as a curvature radius of each optical surface (a paraxial curvature radius in a case of an aspheric surface) R, an interval between surfaces of adjacent optical surfaces D, a refractive index Nd, an Abbe number vd, a lens material (glass material), and the like are shown.

TABLE 6

| | | Optical Characteristics | | | | | |
|---|---|---|---|---|---|---|---|
| SURFACE NUMBER | R | D | $N_d$ | $v_d$ | $P_{g,F}$ | NAME OF GLASS MATERIAL | REMARKS |
| 1 | 173.256 | 0.80 | 1.48749 | 70.45 | 0.5306 | HOYA FC5 | L1 G1 |
| 2* | 13.644 | 2.39 | | | | | |
| 3 | −10.681 | 0.85 | 1.75520 | 27.53 | 0.6090 | HOYA E-FD4 | L2 |
| 4 | −16.894 | 0.20 | | | | | |
| 5 | 21.763 | 0.80 | 1.78472 | 25.72 | 0.6157 | HOYA FD110 | L3 |
| 6 | 8.821 | 2.11 | 1.88300 | 40.80 | 0.5654 | HOYA TAFD30 | L4 |
| 7 | −20.684 | 0.51 | | | | | |
| 8 | APERTURE | 2.00 | | | | | AD |
| 9 | 18.713 | 2.97 | 1.88300 | 40.80 | 0.5654 | HOYA TAFD30 | L5 G2 |
| 10 | −8.715 | 0.80 | 1.68893 | 31.16 | 0.5989 | HOYA E-FD8 | L6 |
| 11 | 15.001 | 2.37 | | | | | |

TABLE 6-continued

Optical Characteristics

| SURFACE NUMBER | R | D | $N_d$ | $v_d$ | $P_{g,F}$ | NAME OF GLASS MATERIAL | REMARKS |
|---|---|---|---|---|---|---|---|
| 12 | −9.020 | 1.20 | 1.85135 | 40.10 | 0.5694 | HOYA M-TAFD305 | L 7 |
| 13* | −10.944 | 8.849 | | | | | |
| 14 | ∞ | 1.40 | 1.51680 | 64.20 | | FILTER | F G |
| 15 | ∞ | | | | | | |

In Table 6, each of a second surface (surface number 2) and a 13th surface (surface number 13) is an aspheric surface.

In Table 5, parameters of each aspheric surface in Expression [10] are as follows.

Parameters of Aspheric Surfaces
Second Surface
K=3.64665
$A_4$=1.55190×10$^{-4}$
$A_6$=4.96963×10$^{-6}$
$A_8$=−2.61329×10$^{-7}$
$A_{10}$=1.11640×10$^{-8}$
13th Surface
K=−1.73578
$A_4$=1.34058×10$^{-4}$
$A_6$=4.52767×10$^{-6}$
$A_8$=1.10405×10$^{-7}$
$A_{10}$=−9.84332×10$^{-10}$ In this case, values corresponding to Conditional Expressions [1] to [9] are as follows. The following values satisfy Conditional Expressions [1] to [9], respectively.

$(r_{1o}+r_{2o})/(r_{1o}-r_{2o})=0.122$ [1]

$(r_{1i}+r_{2i})/(r_{1i}-r_{2i})=0.249$ [2]

$(r_{1s}+r_{2s})/(r_{1s}-r_{2s})=0.050$ [3]

$f_F/f_R=0.349$ [4]

$Y'/f=0.903$ [5]

$\tan(\theta P_{max})=0.899$ [6]

$L/f=1.765$ [7]

$D_T/f=1.081$ [8]

$f_{FF}/f_{RR}=0.360$ [9]

In FIG. 12, various aberrations in a d line and a g line of the imaging lens of Example 6, that is, aberration curve diagrams of spherical aberration, astigmatism, distortion, and comatic aberration are illustrated.

Example 7

FIG. 13 is a vertical sectional diagram along the optical axis illustrating a lens construction of an imaging lens of Example 7 according to an embodiment of the present invention.

That is, as illustrated in FIG. 13, an optical system of the imaging lens of Example 7 includes a first lens L1, a second lens L2, a third lens L3, a fourth lens L4, an aperture AD, a fifth lens L5, a sixth lens L6, a seventh lens L7, and an eighth lens L8, which are arranged in order from the object side to the image side.

The third lens L3 and the fourth lens L4, the fifth lens L5 and the sixth lens L6, and the seventh lens L7 and the eighth lens L8 are each formed as a cemented lens. The optical system of the imaging lens of Example 7 has a so-called 8-element in 5-group construction.

In terms of construction of a lens group, the first lens L1 to the fourth lens L4 are included in a first lens group G1, which has a positive refractive power, as a front lens group, and the fifth lens L5 to the eighth lens L8 are included in a second lens group G2, which has a positive refractive power, as a rear lens group.

That is, the optical system of the imaging lens illustrated in FIG. 13 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative biconcave lens having an aspheric concave surface on the image side where curvature of the aspheric concave surface on the image side is larger than that of a concave surface on the object side. The second lens L2 is a negative meniscus lens having a concave surface on the object side. The third lens L3 is a negative meniscus lens having a convex surface on the object side. The fourth lens L4 is a positive biconvex lens where curvature of a convex surface on the object side is larger than that on the image side. The first lens group G1 is thus constructed to have the positive refractive power.

The third lens L3 and the fourth lens L4 are cemented together to be formed as a cemented lens of two cemented lenses.

Between the first lens group G1 as the front lens group and the second lens group G2 as the rear lens group, the aperture AD is arranged.

The second lens group G2 as the rear lens group includes the fifth lens L5, the sixth lens L6, the seventh lens L7, and the eighth lens L8, which are arranged in order from the object side to the image side. The fifth lens L5 is a positive biconvex lens where curvature of a convex surface on the image side is larger than that on the object side. The sixth lens L6 is a negative biconcave lens where curvature of a concave surface on the object side is larger than that on the image side. The seventh lens L7 is a negative meniscus lens having a concave surface on the object side. The eighth lens L8 is a positive meniscus lens having an aspheric convex surface on the image side. The second lens group G2 is thus constructed to have the positive refractive power.

The fifth lens L5 and the sixth lens L6 are cemented together to be formed as a cemented lens of two cemented lenses, and the seventh lens L7 and the eighth lens L8 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 13, each surface number of each optical surface in the optical system of the imaging lens is also illustrated.

In Example 7, a focal length of an entire optical system f, a smallest F-number F, and a half angle of view ω (degrees) are f=18.30, F=2.56, and ω=38.2, respectively.

The following Table 7 shows optical characteristics of each optical surface in Example 7. In the following Table 7, the optical characteristics such as a curvature radius of each optical surface (a paraxial curvature radius in a case of an aspheric surface) R, an interval between surfaces of adjacent optical surfaces D, a refractive index Nd, an Abbe number vd, a lens material (glass material), and the like are shown.

TABLE 7

Optical Characteristics

| SURFACE NUMBER | R | D | $N_d$ | $v_d$ | $P_{g.F}$ | NAME OF GLASS MATERIAL | REMARKS | |
|---|---|---|---|---|---|---|---|---|
| 1 | −70.091 | 0.80 | 1.84749 | 70.45 | 0.5306 | HOYA FC5 | L 1 | G 1 |
| 2* | 14.457 | 2.23 | | | | | | |
| 3 | −22.847 | 0.80 | 1.69895 | 30.05 | 0.6028 | HOYA E-FD15 | L 2 | |
| 4 | −61.517 | 0.20 | | | | | | |
| 5 | 14.340 | 0.80 | 1.80518 | 25.46 | 0.6156 | HOYA FD60 | L 3 | |
| 6 | 10.587 | 3.23 | 1.77250 | 49.62 | 0.5503 | HOYA TAF1 | L 4 | |
| 7 | −35.067 | 1.51 | | | | | | |
| 8 | APERTURE | 1.00 | | | | | A D | |
| 9 | 14.535 | 2.69 | 1.88300 | 40.80 | 0.5654 | HOYA TAFD30 | L 5 | G 2 |
| 10 | −12.184 | 1.28 | 1.68893 | 31.16 | 0.5989 | HOYA E-FD8 | L 6 | |
| 11 | 14.266 | 2.04 | | | | | | |
| 12 | −11.510 | 0.80 | 1.67270 | 32.17 | 0.5662 | HOYA E-FD5 | L 7 | |
| 13 | −46.938 | 1.15 | 1.82080 | 42.71 | 0.5642 | HOYA M-TAFD51 | L 8 | |
| 14* | −15.876 | 11.835 | | | | | | |
| 15 | ∞ | 1.40 | 1.5168 | 64.20 | | FILTER | F G | |
| 16 | ∞ | | | | | | | |

In Table 7, each of a second surface (surface number 2) and a 14th surface (surface number 14) is an aspheric surface.

In Table 7, parameters of each aspheric surface in Expression [10] are as follows.
Parameters of Aspheric Surfaces
Second Surface
K=2.84801
$A_4$=8.10328×10$^{-5}$
$A_6$=−8.51224×10$^{-7}$
$A_8$=5.97881×10$^{-8}$
$A_{10}$=−9.76289×10$^{-10}$
14th Surface
K=−0.71102
$A_4$=2.26643×10$^{-4}$
$A_6$=2.60218×10$^{-6}$
$A_8$=6.37436×10$^{-8}$
$A_{10}$=−6.07070×10$^{-10}$ In this case, values corresponding to Conditional Expressions [1] to [9] are as follows. The following values satisfy Conditional Expressions [1] to [9], respectively.

$(r_{1o}+r_{2o})/(r_{1o}-r_{2o})$=−0.225　　[1]

$(r_{1i}+r_{2i})/(r_{1i}-r_{2i})$=0.107　　[2]

$(r_{1s}+r_{2s})/(r_{1s}-r_{2s})$=0.414　　[3]

$f_F/f_R$=1.107　　[4]

$Y'/f$=0.776　　[5]

$\tan(\theta P_{max})$=0.751　　[6]

$L/f$=1.763　　[7]

$D_T/f$=1.012　　[8]

$f_{FF}/f_{RR}$=0.160　　[9]

In FIG. 14, various aberrations in a d line and a g line of the imaging lens of Example 7, that is, aberration curve diagrams of spherical aberration, astigmatism, distortion, and comatic aberration are illustrated.

Example 8

FIG. 15 is a vertical sectional diagram along the optical axis illustrating a lens construction of an imaging lens of Example 8 according to an embodiment of the present invention.

That is, as illustrated in FIG. 15, an optical system of the imaging lens of Example 8 includes a first lens L1, a second lens L2, a third lens L3, an aperture AD, a fourth lens L4, a fifth lens L5, a sixth lens L6, and a seventh lens L7, which are arranged in order from the object side to the image side.

The fourth lens L4 and the fifth lens L5, and the sixth lens L6 and the seventh lens L7 are each formed as a cemented lens. The optical system of the imaging lens of Example 8 has a so-called 7-element in 5-group construction.

In terms of construction of a lens group, the first lens L1 to the third lens L3 are included in a first lens group G1, which has a positive refractive power, as a front lens group, and the fourth lens L4 to the seventh lens L7 are included in a second lens group G2, which has a positive refractive power, as a rear lens group.

That is, the optical system of the imaging lens illustrated in FIG. 15 includes the first lens group G1, the aperture AD, and the second lens group G2, which are arranged in order from the object side to the image side.

Specifically, the first lens group G1 as the front lens group includes the first lens L1, the second lens L2, and the third lens L3, which are arranged in order from the object side to the image side. The first lens L1 is a negative meniscus lens having an aspheric concave surface on the image side and a convex surface on the object side. The second lens L2 is a negative plano-concave lens having a concave surface on the object side. The third lens L3 is a positive biconvex lens where curvature of a convex surface on the object side is larger than that on the image side. The first lens group G1 is thus constructed to have the positive refractive power.

Between the first lens group G1 as the front lens group and the second lens group G2 as the rear lens group, the aperture AD is arranged.

The second lens group G2 as the rear lens group includes the fourth lens L4, the fifth lens L5, the sixth lens L6, and the seventh lens L7, which are arranged in order from the object side to the image side. The fourth lens L4 is a positive biconvex lens where a convex surface on the image side is larger than that on the object side. The fifth lens L5 is a negative biconcave lens where curvature of a concave surface on the object side is larger than that on the image side. The sixth lens L6 is a negative meniscus lens having a concave surface on the object side. The seventh lens L7 is a positive meniscus lens having an aspheric convex surface on the image side. The second lens group G2 is thus constructed to have the positive refractive power.

The fourth lens L4 and the fifth lens L5 are cemented together to be formed as a cemented lens of two cemented lenses, and the sixth lens L6 and the seventh lens L7 are cemented together to be formed as a cemented lens of two cemented lenses.

Between the first lens L1 and the second lens L2 in the first lens group G1 as the front lens group, a biconvex air lens is formed. Between the fifth lens L5 and the sixth lens L6 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 15, each surface number of each optical surface in the optical system of the imaging lens is also illustrated.

In Example 8, a focal length of an entire optical system f, a smallest F-number F, and a half angle of view ω (degrees) are f=18.30, F=2.88, and ω=38.2, respectively.

The following Table 8 shows optical characteristics of each optical surface in Example 8. In the following Table 8, the optical characteristics such as a curvature radius of each optical surface (a paraxial curvature radius in a case of an aspheric surface) R, an interval between surfaces of adjacent optical surfaces D, a refractive index Nd, an Abbe number νd, a lens material (glass material), and the like are shown.

TABLE 8

Optical Characteristics

| SURFACE NUMBER | R | D | $N_d$ | $v_d$ | $P_{g.F}$ | NAME OF GLASS MATERIAL | REMARKS | |
|---|---|---|---|---|---|---|---|---|
| 1 | 50.000 | 0.80 | 1.51633 | 64.06 | 0.5404 | OHARA L-BSL7 | L 1 | G 1 |
| 2* | 11.239 | 2.03 | | | | | | |
| 3 | −17.410 | 0.60 | 1.67270 | 32.17 | 0.5962 | HOYA E-FD5 | L 2 | |
| 4 | ∞ | 0.20 | | | | | | |
| 5 | 12.482 | 2.30 | 1.77250 | 49.62 | 0.5503 | HOYA TAF1 | L 3 | |
| 6 | −33.848 | 1.51 | | | | | | |
| 7 | APERTURE | 1.00 | | | | | A D | |
| 8 | 13.642 | 2.82 | 1.88300 | 40.80 | 0.5654 | HOYA TAFD30 | L 4 | G 2 |
| 9 | −8.732 | 0.60 | 1.69895 | 30.05 | 0.5962 | HOYA E-FD15 | L 5 | |
| 10 | 16.067 | 1.85 | | | | | | |
| 11 | −8.748 | 0.80 | 1.64769 | 33.84 | 0.5923 | HOYA E-FD2 | L 6 | |
| 12 | −37.243 | 1.20 | 1.82080 | 42.71 | 0.5642 | HOYA M-TAFD51 | L 7 | |
| 13* | −13.097 | 12.720 | | | | | | |
| 14 | ∞ | 1.40 | 1.51680 | 64.20 | | FILTER | F G | |
| 15 | ∞ | | | | | | | |

In Table 8, each of a second surface (surface number 2) and a 13th surface (surface number 13) is an aspheric surface.

In Table 8, parameters of each aspheric surface in Expression [10] are as follows.

Parameters of Aspheric Surfaces
Second Surface
K=2.31354
$A_4$=4.39060×10$^{-5}$
$A_6$=−1.54647×10$^{-6}$
$A_8$=9.94796×10$^{-8}$
$A_{10}$=−1.38635×10$^{-9}$
13th Surface
K=−2.16285
$A_4$=2.75665×10$^{-4}$
$A_6$=4.58115×10$^{-6}$
$A_8$=1.02845×10$^{-7}$
$A_{10}$=−1.35694×10$^{-9}$ In this case, values corresponding to Conditional Expressions [1] to [9] are as follows. The following values satisfy Conditional Expressions [1] to [9], respectively.

$$(r_{1o}+r_{2o})/(r_{1o}-r_{2o})=-0.215 \quad [1]$$

$$(r_{1i}+r_{2i})/(r_{1i}-r_{2i})=0.295 \quad [2]$$

$$(r_{1s}+r_{2s})/(r_{1s}-r_{2s})=0.425 \quad [3]$$

$$f_F/f_R=1.938 \quad [4]$$

$$Y'/f=0.776 \quad [5]$$

$\tan(\theta P_{max}) = 0.727$      [6]

$L/f = 1.657$      [7]

$D_T/f = 0.858$      [8]

$f_{FF}/f_{RR} = 0.302$      [9]

In FIG. 16, various aberrations in a d line and a g line of the imaging lens of Example 8, that is, aberration curve diagrams of spherical aberration, astigmatism, distortion, and comatic aberration are illustrated.

Example 9

FIG. 17 is a vertical sectional diagram along the optical axis illustrating a lens construction of an imaging lens of Example 9 according to an embodiment of the present invention.

That is, as illustrated in FIG. 17, an optical system of the imaging lens of Example 9 includes a first lens L1, a second lens L2, a third lens L3, a fourth lens L4, an aperture AD, a fifth lens L5, a sixth lens L6, and a seventh lens L7, which are arranged in order from the object side to the image side.

The third lens L3 and the fourth lens L4, and the fifth lens L5 and the sixth lens L6 are each formed as a cemented lens. The optical system of the imaging lens of Example 9 has a so-called 7-element in 5-group construction.

In terms of construction of a lens group, the first lens L1 to the fourth lens L4 are included in a first lens group G1, which has a positive refractive power, as a front lens group, and the fifth lens L5 to the seventh lens L7 are included in a second lens group G2, which has a positive refractive power, as a rear lens group.

That is, the optical system of the imaging lens illustrated in FIG. 17 includes the first lens group G1, the aperture AD, and the second lens group G2, which are arranged in order from the object side to the image side.

Specifically, the first lens group G1 as the front lens group includes the first lens L1, the second lens L2, the third lens L3, and the fourth lens L4, which are arranged in order from the object side to the image side. The first lens L1 is a negative biconcave lens having an aspheric concave surface on the image side where curvature of the aspheric concave surface on the image side is larger than that of a concave surface on the object side. The second lens L2 is a negative planoconcave lens having a concave surface on the object side. The third lens L3 is a negative meniscus lens having a convex surface on the object side. The fourth lens L4 is a positive biconvex lens where curvature of a convex surface on the object side is larger than that on the image side. The first lens group G1 is thus constructed to have the positive refractive power.

The third lens L3 and the fourth lens L4 are cemented together to be formed as a cemented lens of two cemented lenses.

Between the first lens group G1 as the front lens group and the second lens group G2 as the rear lens group, the aperture AD is arranged.

The second lens group G2 as the rear lens group includes the fifth lens L5, the sixth lens L6, and the seventh lens L7, which are arranged in order from the object side to the image side. The fifth lens L5 is a positive biconvex lens where curvature of a convex surface on the image side is larger than that on the object side. The sixth lens L6 is a negative biconcave lens where curvature of a concave surface on the object side is larger than that on the image side. The seventh lens L7 is a negative meniscus lens having a concave surface on the object side and an aspheric convex surface on the image side. The second lens group G2 is thus constructed to have the positive refractive power.

The fifth lens L5 and the sixth lens L6 are cemented together to be formed as a cemented lens of two cemented lenses.

Between the first lens L1 and the second lens L2 in the first lens group G1 as the front lens group, a biconvex air lens is formed. Between the sixth lens L6 and the seventh lens L7 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 17, each surface number of each optical surface in the optical system of the imaging lens is also illustrated.

In Example 9, a focal length of an entire optical system f, a smallest F-number F, and a half angle of view ω (degrees) are f=18.29, F=2.86, and ω=38.2, respectively.

The following Table 9 shows optical characteristics of each optical surface in Example 9. In the following Table 9, the optical characteristics such as a curvature radius of each optical surface (a paraxial curvature radius in a case of an aspheric surface) R, an interval between surfaces of adjacent optical surfaces D, a refractive index Nd, an Abbe number νd, a lens material (glass material), and the like are shown.

TABLE 9

Optical Characteristics

| SURFACE NUMBER | R | D | $N_d$ | $\nu_d$ | $P_{g,F}$ | NAME OF GLASS MATERIAL | REMARKS | |
|---|---|---|---|---|---|---|---|---|
| 1 | −59.837 | 0.80 | 1.51633 | 64.06 | 0.5404 | OHARA L-BSL7 | L 1 | G 1 |
| 2* | 14.557 | 1.72 | | | | | | |
| 3 | −29.907 | 0.80 | 1.71736 | 29.50 | 0.6033 | HOYA E-FD1 | L 2 | |
| 4 | 0.000 | 0.10 | | | | | | |
| 5 | 14.647 | 0.80 | 1.80518 | 25.46 | 0.6156 | HOYA FD60 | L 3 | |
| 6 | 9.191 | 2.63 | 1.83481 | 42.72 | 0.5653 | HOYA TAFD5F | L 4 | |
| 7 | −29.039 | 1.51 | | | | | | |
| 8 | APERTURE | 1.00 | | | | | A D | |
| 9 | 14.089 | 2.80 | 1.91082 | 35.25 | 0.5821 | HOYA TAFD35 | L 5 | G 2 |
| 10 | −8.925 | 0.60 | 1.74077 | 27.76 | 0.6076 | HOYA E-FD13 | L 6 | |

TABLE 9-continued

Optical Characteristics

| SURFACE NUMBER | R | D | $N_d$ | $v_d$ | $P_{g,F}$ | NAME OF GLASS MATERIAL | REMARKS |
|---|---|---|---|---|---|---|---|
| 11 | 12.073 | 1.76 | | | | | |
| 12 | −11.881 | 1.20 | 1.81000 | 41.00 | 0.567 | SUMITA K-VC89 | L 7 |
| 13* | −13.043 | 12.709 | | | | | |
| 14 | ∞ | 1.40 | 1.51680 | 64.20 | | FILTER | F G |
| 15 | ∞ | | | | | | |

In Table 9, each of a second surface (surface number 2) and a 13th surface (surface number 13) is an aspheric surface.

In Table 9, parameters of each aspheric surface in Expression [10] are as follows.

Parameters of Aspheric Surfaces

Second Surface
K=3.95417
$A_4$=1.27851×10$^{-4}$
$A_6$=−3.05355×10$^{-6}$
$A_8$=1.84561×10$^{-7}$
$A_{10}$=−4.22943×10$^{-9}$ 13th Surface
K=−1.85186
$A_4$=1.70529×10$^{-4}$
$A_6$=−5.26357×10$^{-6}$
$A_8$=7.98688×10$^{-8}$
$A_{10}$=4.82347×10$^{-10}$ In this case, values corresponding to Conditional Expressions [1] to [9] are as follows. The following values satisfy Conditional Expressions [1] to [9], respectively.

$$(r_{1o}+r_{2o})/(r_{1o}-r_{2o})=-0.345 \quad [1]$$

$$(r_{1i}+r_{2i})/(r_{1i}-r_{2i})=0.008 \quad [2]$$

$$(r_{1s}+r_{2s})/(r_{1s}-r_{2s})=0.347 \quad [3]$$

$$f_F/f_R=0.879 \quad [4]$$

$$Y'/f=0.776 \quad [5]$$

$$\tan(\theta P_{max})=0.757 \quad [6]$$

$$L/f=1.658 \quad [7]$$

$$D_T/f=0.859 \quad [8]$$

$$f_{FF}/f_{RR}=0.074 \quad [9]$$

In FIG. 18, various aberrations in a d line and a g line of the imaging lens of Example 9, that is, aberration curve diagrams of spherical aberration, astigmatism, distortion, and comatic aberration are illustrated.

Example 10

FIG. 19 is a vertical sectional diagram along the optical axis illustrating a lens construction of an imaging lens of Example 10 according to an embodiment of the present invention.

That is, as illustrated in FIG. 19, an optical system of the imaging lens of Example 9 includes a first lens L1, a second lens L2, a third lens L3, an aperture AD, a fourth lens L4, a fifth lens L5, and a sixth lens L6, which are arranged in order from the object side to the image side.

The fourth lens L4 and the fifth lens L5 are formed as a cemented lens. The optical system of the imaging lens of Example 10 has a so-called 6-element in 5-group construction.

In terms of construction of a lens group, the first lens L1 to the third lens L3 are included in a first lens group G1, which has a positive refractive power, as a front lens group, and the fourth lens L4 to the sixth lens L6 are included in a second lens group G2, which has a positive refractive power, as a rear lens group.

That is, the optical system of the imaging lens illustrated in FIG. 19 includes the first lens group G1, the aperture AD, and the second lens group G2, which are arranged in order from the object side to the image side.

Specifically, the first lens group G1 as the front lens group includes the first lens L1, the second lens L2, and the third lens L3, which are arranged in order from the object side to the image side. The first lens L1 is a negative biconcave lens having an aspheric concave surface on the image side where curvature of the aspheric concave surface on the image side is larger than that of a concave surface on the object side. The second lens L2 is a negative meniscus lens having a concave surface on the object side and a convex surface on the image side. The third lens L3 is a positive biconvex lens having where curvature of a convex surface on the object side is larger than that on the image side. The first lens group G1 is thus constructed to have the positive refractive power.

Between the first lens group G1 as the front lens group and the second lens group G2 as the rear lens group, the aperture AD is arranged.

The second lens group G2 as the rear lens group includes the fourth lens L4, the fifth lens L5, and the sixth lens L6, which are arranged in order from the object side to the image side. The fourth lens L4 is a positive biconvex lens where curvature of a convex surface on the image side is larger than that on the object side. The fifth lens L5 is a negative biconcave lens where curvature of a concave surface on the object side is larger than that on the image side. The sixth lens L6 is a negative meniscus lens having a concave surface on the object side and an aspheric convex surface on the image side. The second lens group G2 is thus constructed to have the positive refractive power.

The fourth lens L4 and the fifth lens L5 are cemented together to be formed as a cemented lens of two cemented lenses.

Between the first lens L1 and the second lens L2 in the first lens group G1 as the front lens group, a biconvex air lens is formed. Between the fifth lens L5 and the sixth lens L6 in the second lens group G2 as the rear lens group, a biconvex air lens is formed.

Additionally, behind, that is, on the image side of the first lens group G1 and the second lens group G2, a filter glass FG illustrated as a parallel flat plate equivalent to a filter such as an optical low-pass filter, an infrared-cut filter, or the like, or a cover glass (seal glass) of a light-receiving element is arranged.

The first lens group G1, the aperture AD, and the second lens group G2, at least when using, are supported integrally by an appropriate holder frame, or the like, and in a case of focusing on an object (photographic subject), they are moved integrally to focus on the object.

In FIG. 19, each surface number of each optical surface in the optical system of the imaging lens is also illustrated.

In Example 10, a focal length of an entire optical system f, a smallest F-number F, and a half angle of view ω (degrees) are f=18.34, F=2.88, and ω=38.2, respectively.

The following Table 10 shows optical characteristics of each optical surface in Example 10. In the following Table 10, the optical characteristics such as a curvature radius of each optical surface (a paraxial curvature radius in a case of an aspheric surface) R, an interval between surfaces of adjacent optical surfaces D, a refractive index Nd, an Abbe number νd, a lens material (glass material), and the like are shown.

TABLE 10

Optical Characteristics

| SURFACE NUMBER | R | D | $N_d$ | $v_d$ | $P_{g,F}$ | NAME OF GLASS MATERIAL | REMARKS | |
|---|---|---|---|---|---|---|---|---|
| 1 | −112.062 | 0.80 | 1.51633 | 64.06 | 0.5404 | OHARA L-BSL7 | L 1 | G 1 |
| 2* | 14.563 | 1.72 | | | | | | |
| 3 | −18.475 | 0.96 | 1.84666 | 23.78 | 0.6191 | HOYA FDS90 | L 2 | |
| 4 | −72.829 | 0.10 | | | | | | |
| 5 | 17.095 | 2.03 | 1.83481 | 42.72 | 0.5653 | HOYA TAFD5F | L 3 | |
| 6 | −22.624 | 1.52 | | | | | | |
| 7 | APERTURE | 1.00 | | | | | A D | |
| 8 | 13.993 | 3.04 | 1.88300 | 40.80 | 0.5654 | HOYA TAFD30 | L 4 | G 2 |
| 9 | −8.224 | 0.80 | 1.69895 | 30.05 | 0.5962 | HOYA E-FD15 | L 5 | |
| 10 | 12.635 | 1.85 | | | | | | |
| 11 | −11.280 | 1.20 | 1.80139 | 45.45 | 0.5581 | HOYA M-TAF31 | L 6 | |
| 12* | −12.891 | 12.831 | | | | | | |
| 13 | ∞ | 1.40 | 1.51680 | 64.20 | | FILTER | F G | |
| 14 | ∞ | | | | | | | |

In Table 10, each of a second surface (surface number 2) and a 12th surface (surface number 12) is an aspheric surface.

In Table 10, parameters of each aspheric surface in Expression [10] are as follows.

Parameters of Aspheric Surfaces

Second Surface
K=5.10838
$A_4$=1.41564×10$^{-4}$
$A_6$=−5.85441×10$^{-6}$
$A_8$=4.02424×10$^{-7}$
$A_{10}$=−1.02386×10$^{-8}$ 12th Surface
K=−1.04743
$A_4$=2.38348×10$^{-4}$
$A_6$=6.15092×10$^{-6}$
$A_8$=9.61558×10$^{-8}$
$A_{10}$=2.11010×10$^{-10}$ In this case, values corresponding to Conditional Expressions [1] to [9] are as follows. The following values satisfy Conditional Expressions [1] to [9], respectively.

$(r_{1o}+r_{2o})/(r_{1o}−r_{2o})$=−0.118    [1]

$(r_{1i}+r_{2i})/(r_{1i}−r_{2i})$=0.057    [2]

$(r_{1s}+r_{2s})/(r_{1s}−r_{2s})$=0.236    [3]

$f_F/f_R$=1.398    [4]

$Y'/f$=0.776    [5]

$\tan(\theta P_{max})$=0.746    [6]

$L/f$=1.626    [7]

$D_T/f$=0.821    [8]

$f_{FF}/f_{RR}$=0.148    [9]

In FIG. 20, various aberrations in a d line and a g line of the imaging lens of Example 10, that is, aberration curve diagrams of spherical aberration, astigmatism, distortion, and comatic aberration are illustrated.

Example 11

Next, with reference to FIGS. 21A to 23, an imaging apparatus of Example 11 according to an embodiment of the present invention using an imaging lens of Examples 1 to 10 according to an embodiment of the present invention will be explained.

Figure 21A:
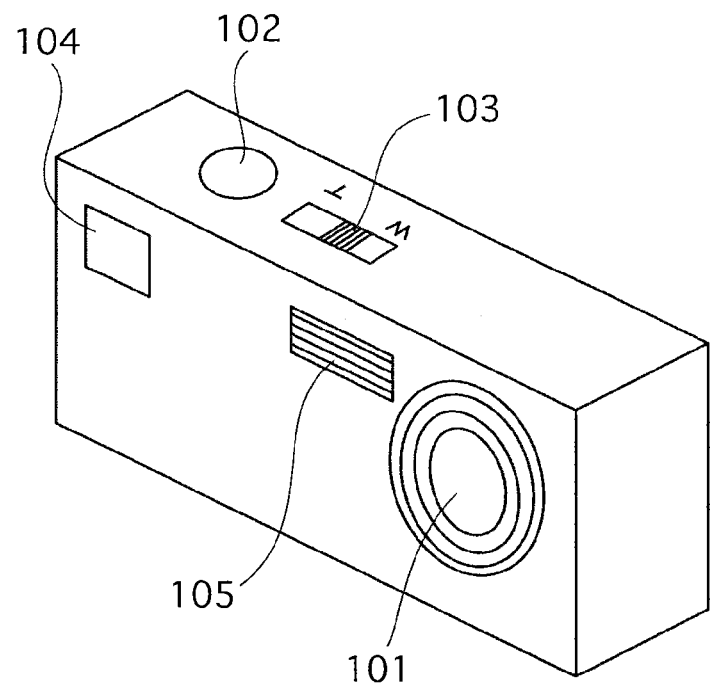
FIG. 21A illustrates a state of the digital camera where the imaging lens is collapsed in a body of the digital camera.
Figure 21B:
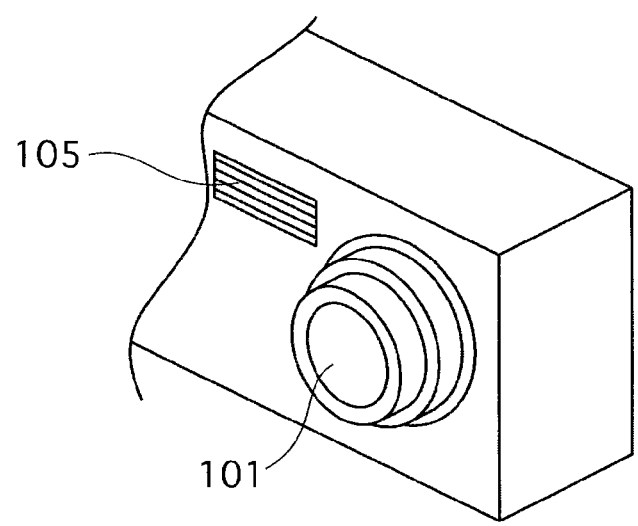
FIG. 21B illustrates a state of the digital camera where the imaging lens is extended from the body of the digital camera.

Each of FIGS. 21A and 21B schematically illustrates an external construction of a digital camera as an imaging apparatus of Example 11, as viewed from a photographic subject side (that is, from a front side as an object side). FIG. 21A is a perspective diagram illustrating a state where the imaging lens is collapsed in a body of the digital camera. FIG. 21B is a perspective diagram illustrating a state where the imaging lens is extended from the body of the digital camera.

Figure 22:
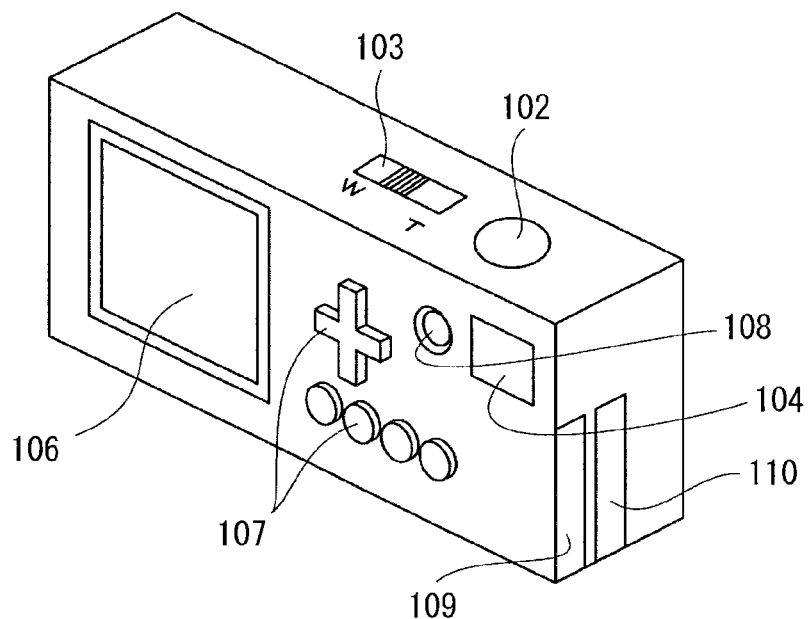
FIG. 22 is a perspective diagram as viewed from a rear side, that is, from a photographer side, schematically illustrating an external construction of the digital camera illustrated in FIGS. 21A and 21B.

FIG. 22 is a perspective diagram schematically illustrating an external construction of the digital camera as viewed from a photographer's side (that is, from a rear side).

Figure 23:
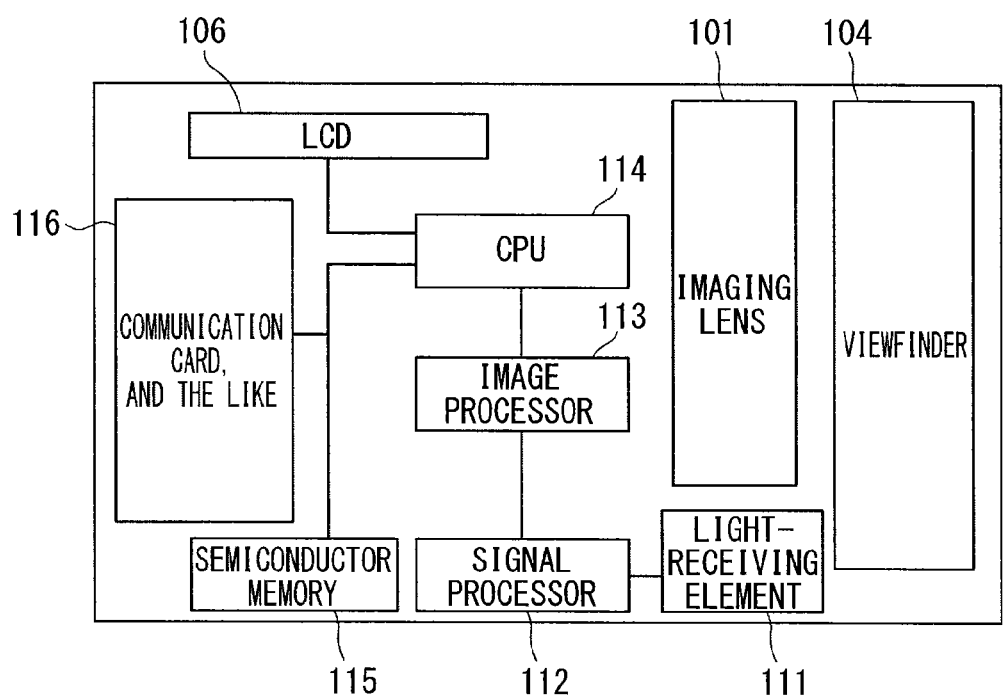
FIG. 23 schematically illustrates a functional block diagram of the digital camera illustrated in FIGS. 21A, 21B, and 22.

FIG. 23 schematically illustrates a functional block diagram of the digital camera.

Note that here a digital camera as the imaging apparatus is explained; however, there are many cases where an imaging function equivalent to the digital camera is incorporated into not only mainly imaging apparatuses exclusive for imaging including a video camera, a film camera, and the like, but also various information devices including a mobile phone, a portable information terminal device called a PDA (Personal Data Assistance) and the like, and additionally, a mobile terminal device called a smartphone having a combination of those functions.

Such an information device that is slightly different in appearance substantially includes function and construction exactly the same as those of the digital camera, and the imaging lens according to an embodiment of the present invention can be adopted in such an information device.

As illustrated in FIGS. 21A, 21B, and 22, the digital camera includes an imaging lens 101, a shutter button 102, a zoom button 103, a viewfinder 104, a flash 105, an LCD (Liquid Crystal Display) 106, an operation button 107, a power switch 108, a memory card slot 109, a communication card slot 110, and the like.

Additionally, as illustrated in FIG. 23, the digital camera includes a light-receiving element 111, a signal processor 112, an image processor 113, a Central Processing Unit (CPU) 114, a semiconductor memory 115, a communication card, and the like 116.

The digital camera has the imaging lens 101, and the light-receiving element 111 as an area sensor such as a CMOS (Complementary Metal-Oxide Semiconductor) image sensor, a CCD (Charge-Coupled Device) image sensor, or the like, and forms an optical image of an object as a shooting object, that is, a photographic subject by the imaging lens 101 as an optical system for imaging, and reads the optical image by the light-receiving element 111.

As the imaging lens 101, the imaging lens according to an embodiment of the present invention is used, which has been explained in each of Examples 1 to 10.

An output of the light-receiving element 111 is processed by the signal processor 112 controlled by the CPU 114, and converted to digital image information.

The image information digitalized by the signal processor 112 is recorded in the semiconductor memory 115 such as a non-volatile memory or the like, after a predetermined image processing is performed in the image processor 113 controlled by the CPU 114.

In this case, the semiconductor memory 115 can be a memory card inserted in the memory card slot 109, or an internal semiconductor memory in the body of the digital camera.

On the LCD 106, an image while shooting can be displayed, and an image recorded in the semiconductor memory 115 can be displayed. Additionally, the image recorded in the semiconductor memory 115 can be sent to an external device via the communication card, and the like 116 inserted in the communication card slot 110, or the like.

When carrying the digital camera, the imaging lens 101 is in a collapsed state as illustrated in FIG. 21A, and is collapsed in the body of the digital camera, and when a user operates the power button 102 to turn on the digital camera, the imaging lens 101 is extended as illustrated in FIG. 21B and protrudes from the body of the digital camera.

By operating the zoom button 103, a digital zoom-type zooming that changes magnification virtually by changing an extraction range of a photographic subject image can be performed. At this time, it is preferable that an optical system of the viewfinder 104 also change magnification in conjunction with a change of an effective angle of view.

In many cases, by half-pressing the shutter button 102, focusing is performed.

When the shutter button is further pressed and in a fully-pressed state, shooting is performed, and then the above processing is performed.

In a case where an image recorded in the semiconductor memory 115 is displayed on the LCD 106, or sent to an external device via the communication card, and the like 116, the operation button 107 is operated in a predetermined manner.

Each of the semiconductor memory 115, and the communication card, and the like 116 is used by being inserted in an exclusive slot such as the memory card slot 109, the communication card slot 110, and the like, or a general slot.

Note that when the imaging lens 101 is in the collapsed state, each group of the imaging lens does not have to be arranged in a position on the optical axis.

For example, if a mechanism is made such that when the imaging lens 101 is in the collapsed state, the second lens group G2 withdraws from a position on the optical axis, and is stored in parallel with the first lens group G1, further miniaturization of a digital camera can be achieved.

In the above digital camera (imaging apparatus), or information device, as described above, the imaging lens 101 constructed of the imaging lens according to an embodiment of the present invention can be used as an imaging optical system.

Therefore, it is possible to achieve a miniaturized digital camera (imaging apparatus) with high picture quality using a light-receiving element having equal to or more than 12 to 24 mega pixels, or information device.

According to an embodiment of the present invention, it is possible to provide an imaging lens with high performance that is wide-angle where a half angle of view is approximately 35 to 43 degrees, has a large diameter where a smallest F-number is approximately F2.8, is small in all of an entire length, an entire thickness, and a diameter of the lens, sufficiently reduces various aberrations, and has resolution corresponding to a 12 to 24 mega-pixel image sensor.

That is, the imaging lens according to an embodiment of the present invention includes a plurality of lenses. A surface on an image side of a lens on an object side and a surface on the object side of a lens on the image side of two lenses arranged adjacently and separately from each other face each other across an air space, the air space is termed an air lens, and a shape of the air lens is defined such that the surface on the image side of the lens on the object side is taken as a surface on the object side of the air lens, and the surface on the object side of the lens on the image side is taken as a surface on the image side of the air lens. In the imaging lens, an air lens positioned on a most object side and an air lens positioned on a most image side are each formed in a biconvex shape.

Therefore, it is possible to achieve an imaging lens with high performance that is wide-angle, has a large diameter, is small in all of an entire length, an entire thickness, a diameter of the lens, sufficiently reduces various aberrations, and has resolution corresponding to an image sensor having a large number of pixels.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:
1. An imaging lens, comprising:
a plurality of lenses,
wherein, for two lenses which are arranged adjacently and separately from each other, a first surface on an image side of one of the lenses closer to an object side and a second surface on the object side of the other of the lenses closer to the image side face each other across an air space, the air space being termed an air lens,
wherein a shape of the air lens is defined such that the first surface on the image side of the one of the lenses closer to the object side is taken as a first surface on the object side of the air lens and the second surface on the object side of the other of the lenses closer to the image side is taken as a second surface on the image side of the air lens, wherein the plurality of lenses includes at least first and second air lenses, the first air lens being positioned on a most object side in the imaging lens and the second air lens being positioned on a most image side in the imaging lens each have a biconvex shape, and wherein the first air lens positioned on the most object side in the imaging lens and the second air lens positioned on the most image side in the imaging lens are the only air lenses having a negative power in the imaging lens.

2. The imaging lens according to claim 1, including a front lens group having a positive refractive power, an aperture, and a rear lens group having a positive refractive power arranged in order from the object side to the image side, wherein the first air lens positioned on the most object side is arranged in the front lens group, and the second air lens positioned on the most image side is arranged in the rear lens group.

3. The imaging lens according to claim 2, wherein a surface on the most image side of the front lens group and a surface on the most object side of the rear lens group each have a convex surface.

4. An imaging lens, comprising:

a plurality of lenses, wherein, for two lenses which are arranged adjacently and separately from each other in the imaging lens, a first surface on an image side of one of the lenses closer to an object side and a second surface on the object side of the other of the lenses closer to the image side face each other across an air space, the air space being termed an air lens, wherein a first air lens is positioned on a most object side in the imaging lens, and a second air lens is positioned on a most image side in the imaging lens, wherein a surface on the image side of the one of the lenses closer to the object side forming the first air lens is a concave surface, and a surface on the object side of the other of the lenses closer to the image side forming the first air lens is a concave surface, wherein a surface on the image side of the one of the lenses closer to the object side forming the second air lens is a concave surface, and a surface on the object side of the other of the lenses closer to the image side forming the second air lens is a concave surface, wherein the imaging lens includes a front lens group having a positive refractive power, an aperture, and a rear lens group having a positive refractive power arranged in order from the object side to the image side, and wherein the first air lens is arranged in the front lens group, and the second air lens is arranged in the rear lens group.

5. The imaging lens according to claim 4, wherein the imaging lens is configured to satisfy Conditional Expressions:

$$-0.6<(r_{1o}+r_{2o})/(r_{1o}-r_{2o})<0.3 \quad [1]$$

$$-0.2<(r_{1i}+r_{2i})/(r_{1i}-r_{2i})<0.5 \quad [2]$$

where $r_{1o}$ is a curvature radius of the surface on the image side of the lens on object side forming the first air lens, $r_{2o}$ is a curvature radius of the surface on the object side of the lens on the image side forming the first air lens, $r_{1i}$ is a curvature radius of the surface on the image side of the lens on the object side forming the second air lens, and $r_{2i}$ is a curvature radius of the surface on the object side of the lens on the image side forming the second air lens.

6. The imaging lens according to claim 4, wherein the front lens group and the rear lens group each have equal to or more than three lenses and less than or equal to four lenses.

7. The imaging lens according to claim 4, wherein a surface on the most image side of the front lens group and a surface on the most object side of the rear lens group each have a convex surface.

8. An imaging apparatus comprising: an imaging optical system constructed of the imaging lens according to claim 4.

9. An information device having an imaging function, comprising: an imaging optical system constructed of the imaging lens according to claim 4.

10. An imaging lens, comprising:

a plurality of lenses, wherein, for two lenses which are arranged adjacently and separately from each other, a first surface on an image side of one of the lenses closer to an object side and a second surface on the object side of the other of the lenses closer to the image side face each other across an air space, the air space being termed an air lens, wherein a shape of the air lens is defined such that the first surface on the image side of the one of the lenses closer to the object side is taken as a first surface on the object side of the air lens and the second surface on the object side of the other of the lenses closer to the image side is taken as a second surface on the image side of the air lens, wherein the plurality of lenses includes at least first and second air lenses, the first air lens being positioned on a most object side in the imaging lens and the second air lens being positioned on a most image side in the imaging lens each have a biconvex shape, wherein the imaging lens includes a front lens group having a positive refractive power, an aperture, and a rear lens group having a positive refractive power arranged in order from the object side to the image side, and wherein the first air lens positioned on the most object side is arranged in the front lens group, and the second air lens positioned on the most image side is arranged in the rear lens group.

11. The imaging lens according to claim 10, wherein the imaging lens is configured to satisfy Conditional Expressions:

$$-0.6<(r_{1o}+r_{2o})/(r_{1o}-r_{2o})<0.3 \quad [1]$$

$$-0.2<(r_{1i}+r_{2i})/(r_{1i}-r_{2i})<0.5 \quad [2]$$

where $r_{1o}$ is a curvature radius of a surface on the object side of the first air lens positioned on the most object side, $r_{2o}$ is a curvature radius of a surface on the image side of the first air lens positioned on the most object side, $r_{1i}$ is a curvature radius of a surface on the object side of the second air lens positioned on the most image side, and $r_{2i}$ is a curvature radius of a surface on the image side of the second air lens positioned on the most image side.

12. The imaging lens according to claim 10, wherein the front lens group and the rear lens group each have equal to or more than three lenses and less than or equal to four lenses.

13. The imaging lens according to claim 10, wherein the imaging lens is configured to satisfy Conditional Expression:

$$0.3<f_F/f_R<2.5 \quad [4]$$

where $f_F$ is a focal length of the front lens group, and $f_R$ is a focal length of the rear lens group.

14. The imaging lens according to claim 10, wherein the imaging lens is configured to satisfy Conditional Expressions:

$$0.7 < Y'/f < 0.95 \quad [5]$$

$$0.6 < \tan(\theta P_{max}) < 0.95 \quad [6]$$

where Y' is a maximum image height, f is a focal length of an entire system of the imaging lens in a state of focusing on an object at infinity, and $\theta P_{max}$ is an incident angle of a principal ray onto an image plane that reaches the maximum image height.

15. The imaging lens according to claim 10, wherein the imaging lens is configured to satisfy Conditional Expression:

$$1.4 < L/f < 2.0 \quad [7]$$

where L is a distance from a surface on a most object side of the imaging lens to an image plane in a state of focusing on an object at infinity, and f is a focal length of an entire system of the imaging lens in a state of focusing on an object at infinity.

16. The imaging lens according to claim 10, wherein the imaging lens is configured to satisfy Conditional Expression:

$$0.7 < D_T/f < 1.2 \quad [8]$$

where Dt is a distance from a surface on a most object side of the imaging lens to a surface on a most image side of the imaging lens, and f is a focal length of an entire system of the imaging lens in a state of focusing on an object at infinity.

17. An imaging apparatus comprising: an imaging optical system constructed of the imaging lens according to claim 10.

18. An information device having an imaging function, comprising: an imaging optical system constructed of the imaging lens according to claim 10.

19. The imaging lens according to claim 10, wherein a surface on the most image side of the front lens group and a surface on the most object side of the rear lens group each have a convex surface.

20. The imaging lens according to claim 19, wherein the imaging lens is configured to satisfy Conditional Expression:

$$-0.2 < (r_{1s} + r_{2s})/(r_{1s} - r_{2s}) < 0.7 \quad [3]$$

where $r_{1s}$ is a curvature radius of the surface on the most image side of the front lens group, and $r_{2s}$ is a curvature radius of the surface on the most object side of the rear lens group.

* * * * *